US012750480B2

(12) United States Patent
Bang et al.

(10) Patent No.: US 12,750,480 B2
(45) Date of Patent: *Sep. 29, 2026

(54) METHOD AND DEVICE FOR EFFECTIVE VIDEO ENCODING/DECODING VIA LOCAL LIGHTING COMPENSATION

(71) Applicant: Electronics and Telecommunications Research Institute, Daejeon (KR)

(72) Inventors: Gun Bang, Daejeon (KR); Hui Yong Kim, Daejeon (KR); Dong Gyu Sim, Seoul (KR); Seoung Jun Oh, Seongnam-si (KR); Sea Nae Park, Seoul (KR); Jun Taek Park, Seoul (KR); Jong Seok Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 20 days.

This patent is subject to a terminal disclaimer.

(21) Appl. No.: 18/913,983

(22) Filed: Oct. 11, 2024

(65) Prior Publication Data

US 2025/0039368 A1 Jan. 30, 2025

Related U.S. Application Data

(60) Continuation of application No. 18/186,025, filed on Mar. 17, 2023, now Pat. No. 12,137,218, which is a (Continued)

(30) Foreign Application Priority Data

Jul. 18, 2018 (KR) .................. KR10-2018-0083641
Sep. 28, 2018 (KR) .................. KR10-2018-0115944

(51) Int. Cl.

*H04N 19/117* (2014.01)
*H04N 19/105* (2014.01)

(Continued)

(52) U.S. Cl.

CPC ......... *H04N 19/117* (2014.11); *H04N 19/105* (2014.11); *H04N 19/159* (2014.11);

(Continued)

(58) Field of Classification Search

CPC ........................... H04N 19/117; H04N 19/105

See application file for complete search history.

(56) References Cited

U.S. PATENT DOCUMENTS 9,131,239 B2 * 9/2015 Zheng .................... H04N 19/52
9,848,201 B2 * 12/2017 Jia ........................ H04N 19/513

(Continued)

FOREIGN PATENT DOCUMENTS

KR 100786404 B1 12/2007
KR 1020130085013 A 7/2013

(Continued)

OTHER PUBLICATIONS

Chen, Jianle et al. "Algorithm Description of Joint Exploration Test Model 7 (JEM 7)," Joint Video Exploration Team (JVET) of ITU-T SG 16 WP 3 and ISO/IEC JTC 1/SC 29/WG 11. JVET-G1001-v1. Jul. 2017.

(Continued)

*Primary Examiner* — Irfan Habib

(74) *Attorney, Agent, or Firm* — BROADVIEW IP LAW, PC

(57) ABSTRACT

There is provided an image decoding method comprising: deriving a first prediction value of a current block by using at least one sample included in a reference block, obtaining an illumination compensation parameter on the basis of a predetermined reference region, deriving a second prediction value of the current block by applying the illumination compensation parameter to the first prediction value and reconstructing the current block on the basis of the second prediction value.

6 Claims, 16 Drawing Sheets

Related U.S. Application Data division of application No. 17/260,948, filed as application No. PCT/KR2019/008908 on Jul. 18, 2019, now Pat. No. 11,632,546.

(51) Int. Cl.
*H04N 19/159* (2014.01)
*H04N 19/167* (2014.01)
*H04N 19/176* (2014.01)
*H04N 19/186* (2014.01)

(52) U.S. Cl.
CPC ......... *H04N 19/167* (2014.11); *H04N 19/176* (2014.11); *H04N 19/186* (2014.11)

(56) References Cited

U.S. PATENT DOCUMENTS

| | | | | |
|---|---|---|---|---|
| 9,906,786 | B2 * | 2/2018 | Seregin | H04N 19/30 |
| 10,554,967 | B2 * | 2/2020 | Gu | H04N 19/119 |
| 10,887,597 | B2 * | 1/2021 | Liu | H04N 19/51 |
| 11,051,021 | B2 * | 6/2021 | Aono | H04N 19/117 |
| 11,057,642 | B2 * | 7/2021 | Zhang | H04N 19/593 |
| 11,082,709 | B2 * | 8/2021 | Yang | H04N 19/132 |
| 11,172,202 | B2 * | 11/2021 | Zhang | H04N 19/176 |
| 11,252,421 | B2 * | 2/2022 | Choe | H04N 19/186 |
| 11,343,505 | B2 * | 5/2022 | Zhang | H04N 19/157 |
| 11,356,708 | B2 * | 6/2022 | Dong | H04N 19/86 |
| 11,394,995 | B2 * | 7/2022 | Zhang | H04N 19/105 |
| 11,405,609 | B2 * | 8/2022 | Chen | H04N 19/105 |
| 11,438,613 | B2 * | 9/2022 | Xu | H04N 19/433 |
| 11,706,426 | B2 * | 7/2023 | Choi | H04N 19/59 375/240.12 |
| 2011/0007800 | A1 * | 1/2011 | Zheng | H04N 19/136 375/E7.243 |
| 2012/0328013 | A1 * | 12/2012 | Budagavi | H04N 19/105 375/E7.243 |
| 2013/0215968 | A1 | 8/2013 | Jeong et al. | |
| 2014/0133559 | A1 | 5/2014 | Kim et al. | |
| 2014/0139627 | A1 | 5/2014 | Chen et al. | |
| 2014/0177712 | A1 * | 6/2014 | Fartukov | H04N 19/86 375/240.12 |
| 2015/0237364 | A1 * | 8/2015 | Chujoh | H04N 19/105 375/240.12 |
| 2015/0288980 | A1 * | 10/2015 | Lee | H04N 19/13 375/240.16 |
| 2016/0381374 | A1 | 12/2016 | Bang et al. | |
| 2018/0077426 | A1 * | 3/2018 | Zhang | H04N 19/157 |
| 2018/0098070 | A1 * | 4/2018 | Chuang | H04N 19/51 |
| 2018/0115783 | A1 | 4/2018 | Kang et al. | |
| 2020/0213600 | A1 * | 7/2020 | Seregin | H04N 19/186 |
| 2020/0267385 | A1 * | 8/2020 | Lim | H04N 19/117 |
| 2021/0051342 | A1 * | 2/2021 | Galpin | H04N 19/147 |

FOREIGN PATENT DOCUMENTS

| | | | |
|---|---|---|---|
| KR | 11020150110357 | A | 10/2015 |
| KR | 101700966 | B1 | 1/2017 |
| KR | 1020180005120 | A | 1/2018 |
| KR | 1020180016389 | A | 2/2018 |
| KR | 101855293 | B1 | 6/2018 |
| KR | 1020180074000 | A | 7/2018 |
| WO | 2009089032 | A2 | 7/2009 |
| WO | 2016200777 | A1 | 12/2016 |

OTHER PUBLICATIONS

Anish Tamse et al., [CE4.6.3—Inter Prediction Refinement in JVET-J0024], Document: JVET-K0118-v1, Joint Video Experts Team (JVET) of ITU-T SG 16 WP 3 and ISO/IEC JTC 1/SC 29/WG 11, 11th Meeting, Jul. 10-18, 2018, pp. 1-3, Ljubljana, SI.

Jongseok Lee et al., DC prediction based Local Illuminance Compensation (LIC), Document: JVET-L0068, Joint Video Experts Team (JVET) of ITU-T SG 16 WP 3 and ISO/IEC JTC 1/SC 29/WG 11, 12th Meeting, Oct. 3-12, 2018, pp. 1-5, Macao, CN.

* cited by examiner

METHOD AND DEVICE FOR EFFECTIVE VIDEO ENCODING/DECODING VIA LOCAL LIGHTING COMPENSATION

CROSS-REFERENCE TO RELATED APPLICATIONS

The present application is a continuation of U.S. application Ser. No. 18/186,025, filed on Mar. 17, 2023, which is a divisional application of U.S. application Ser. No. 17/260,948, filed on Jan. 15, 2021, granted U.S. Pat. No. 11,632,546, issued on Apr. 18, 2023, which was the National Stage of International Application No. PCT/KR2019/008908 filed on Jul. 18, 2019, which claims priority to Korean Patent Applications: KR 10-2018-0083641, filed on Jul. 18, 2018, and KR 10-2018-0115944, filed on Sep. 28, 2018, with the Korean Intellectual Property Office, which are incorporated herein by reference in their entirety.

TECHNICAL FIELD

The present invention relates to an image encoding/decoding method and an image encoding/decoding apparatus. More particularly, the present invention relates to an image encoding/decoding method and an image encoding/decoding apparatus based on local illumination compensation.

BACKGROUND ART

Demands for high-resolution and high-quality images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image compression techniques may be utilized.

DISCLOSURE

Technical Problem

The present invention is intended to provide an image encoding/decoding method and an image encoding/decoding apparatus based on local illumination compensation.

Also, the present invention is intended to provide an image encoding/decoding method and an image encoding/decoding apparatus based on local illumination compensation through derivation of a relationship between samples.

Also, the present invention is intended to provide a method and an apparatus for enhancing image encoding/decoding efficiency by more adaptively obtaining an illumination compensation coefficient.

Technical Solution

According to the present invention, there is provided an image decoding method comprising:

deriving a first prediction value of a current block by using at least one sample included in a reference block; obtaining an illumination compensation parameter on the basis of a predetermined reference region; deriving a second prediction value of the current block by applying the illumination compensation parameter to the first prediction value; and reconstructing the current block on the basis of the second prediction value.

According to one embodiment, the first prediction value is one among a value of a reference sample included in the reference block corresponding to a position of at least one sample included in the current block and a value obtained by performing predetermined filtering on the reference sample.

According to one embodiment, the filtering is performed on the basis of a predetermined mapping table.

According to one embodiment, information on the mapping table is signaled in an adaptation parameter set.

According to one embodiment, the predetermined mapping table includes a first mapping table, the first mapping table is derived on the basis of the information on the mapping table, and a second mapping table corresponding to the first mapping table is derived using the first mapping table.

According to one embodiment, when the current block is in an intra prediction mode, the filtering is performed using the first mapping table, and when the current block is in an inter prediction mode, the filtering is performed using the first mapping table and the second mapping table.

According to one embodiment, the illumination compensation parameter is obtained on the basis of a linear relationship between the reference region and the current block.

According to one embodiment, the illumination compensation parameter includes at least one among a weighting factor, an offset, and a filter coefficient.

According to one embodiment, the second prediction value is obtained by applying at least one among the weighting factor and the offset to the first prediction value.

According to one embodiment, the method further comprises obtaining, when the current block is a luma block, a residual block for a chroma block corresponding to the luma block, on the basis of an illumination compensation parameter for the luma block.

Also, according to the present invention, there is provided an image encoding method comprising: deriving a first prediction value of a current block by using at least one sample included in a reference block; obtaining an illumination compensation parameter on the basis of a predetermined reference region; deriving a second prediction value of the current block by applying the illumination compensation parameter to the first prediction value; and encoding information on the illumination compensation parameter.

According to one embodiment, the first prediction value is one among a value of a reference sample included in the reference block corresponding to a position of at least one sample included in the current block and a value obtained by performed predetermined filtering on the reference sample.

According to one embodiment, the filtering is performed on the basis of a predetermined mapping table.

According to one embodiment, information on the mapping table is signaled in an adaptation parameter set.

According to one embodiment, the predetermined mapping table includes a first mapping table, the first mapping table is derived on the basis of the information on the mapping table, and a second mapping table corresponding to the first mapping table is derived using the first mapping table.

According to one embodiment, when the current block is in an intra prediction mode, the filtering is performed using the first mapping table, and when the current block is in an inter prediction mode, the filtering is performed using the first mapping table and the second mapping table.

According to one embodiment, the illumination compensation parameter is obtained on the basis of a linear relationship between the reference region and the current block.

According to one embodiment, the illumination compensation parameter includes at least one among a weighting factor, an offset, and a filter coefficient.

According to one embodiment, the second prediction value is obtained by applying at least one among the weighting factor and the offset to the first prediction value.

According to one embodiment, the method further comprises obtaining, when the current block is a luma block, a residual block for a chroma block corresponding to the luma block, on the basis of an illumination compensation parameter for the luma block.

Also, according to the present invention, there is provided a computer-readable non-transitory recording medium storing image data that is received and decoded by an image decoding apparatus to be used for reconstructing an image, wherein the image data includes information on an illumination compensation parameter, the information on the illumination compensation parameter is used to obtain an illumination compensation parameter for a current block on the basis of a predetermined reference region, a first prediction value of the current block is derived using at least one sample included in a reference block, a second prediction value of the current block is derived by applying the illumination compensation parameter to the first prediction value, and the current block is reconstructed on the basis of the second prediction value.

Advantageous Effects

According to the present invention, it is possible to provide a method and an apparatus for encoding/decoding an image on the basis of local illumination compensation.

Also, according to the present invention, it is possible to provide a method and an apparatus for encoding/decoding an image on the basis of local illumination compensation through derivation of a relationship between samples.

Also, according to the present invention, it is possible to provide a method and an apparatus for enhancing image encoding/decoding efficiency by more adaptively obtaining an illumination compensation coefficient.

MODE FOR INVENTION

Figure 1:
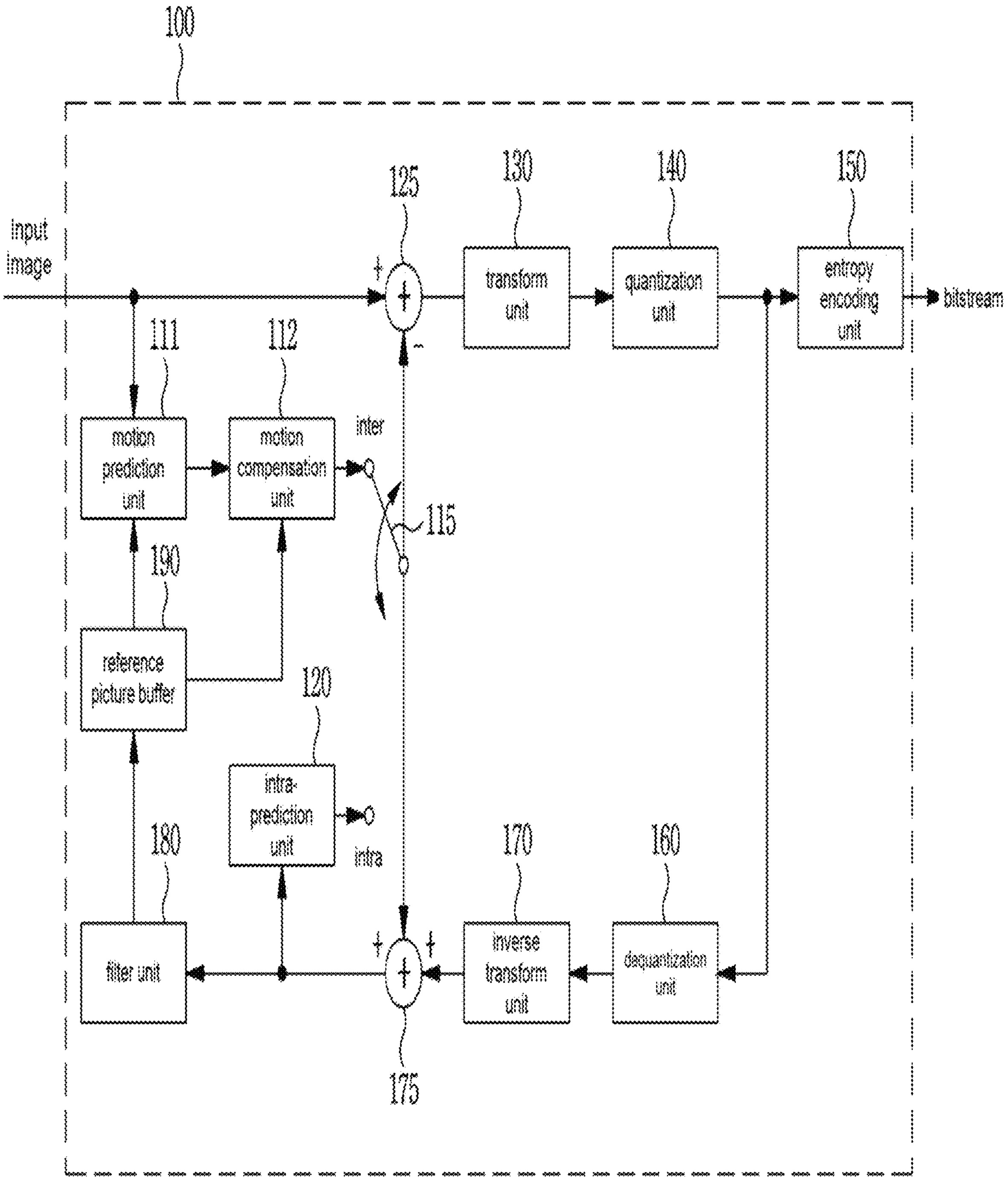
FIG. 1 is a block diagram illustrating a configuration according to an example of an encoding apparatus to which the present invention applies.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to 2Bd−1 according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quaternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term “tile group” means a group of tiles and has the same meaning as a slice.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms “reference picture” and “reference image” have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
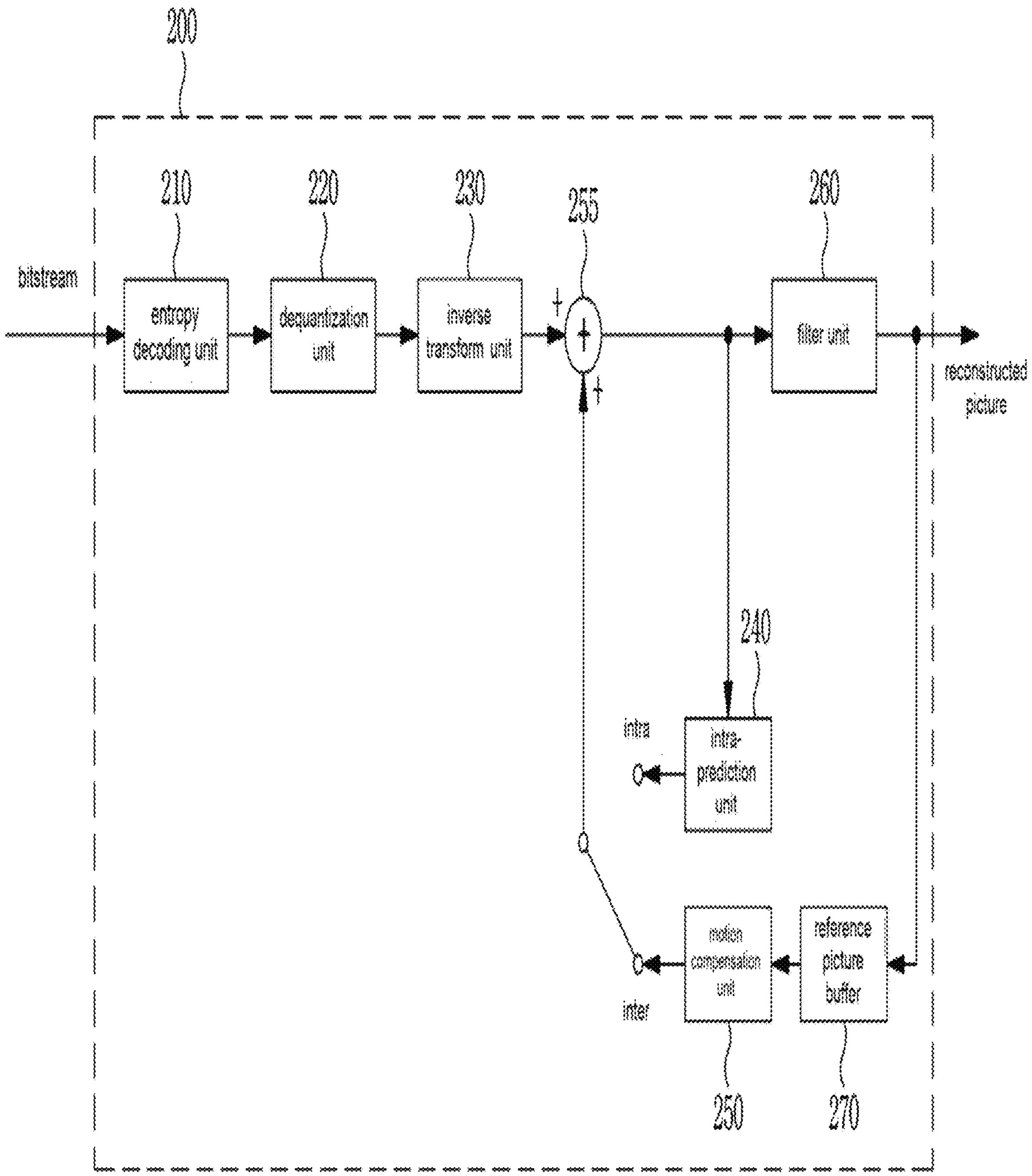
FIG. 2 is a block diagram illustrating a configuration according to an example of a decoding apparatus to which the present invention applies.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
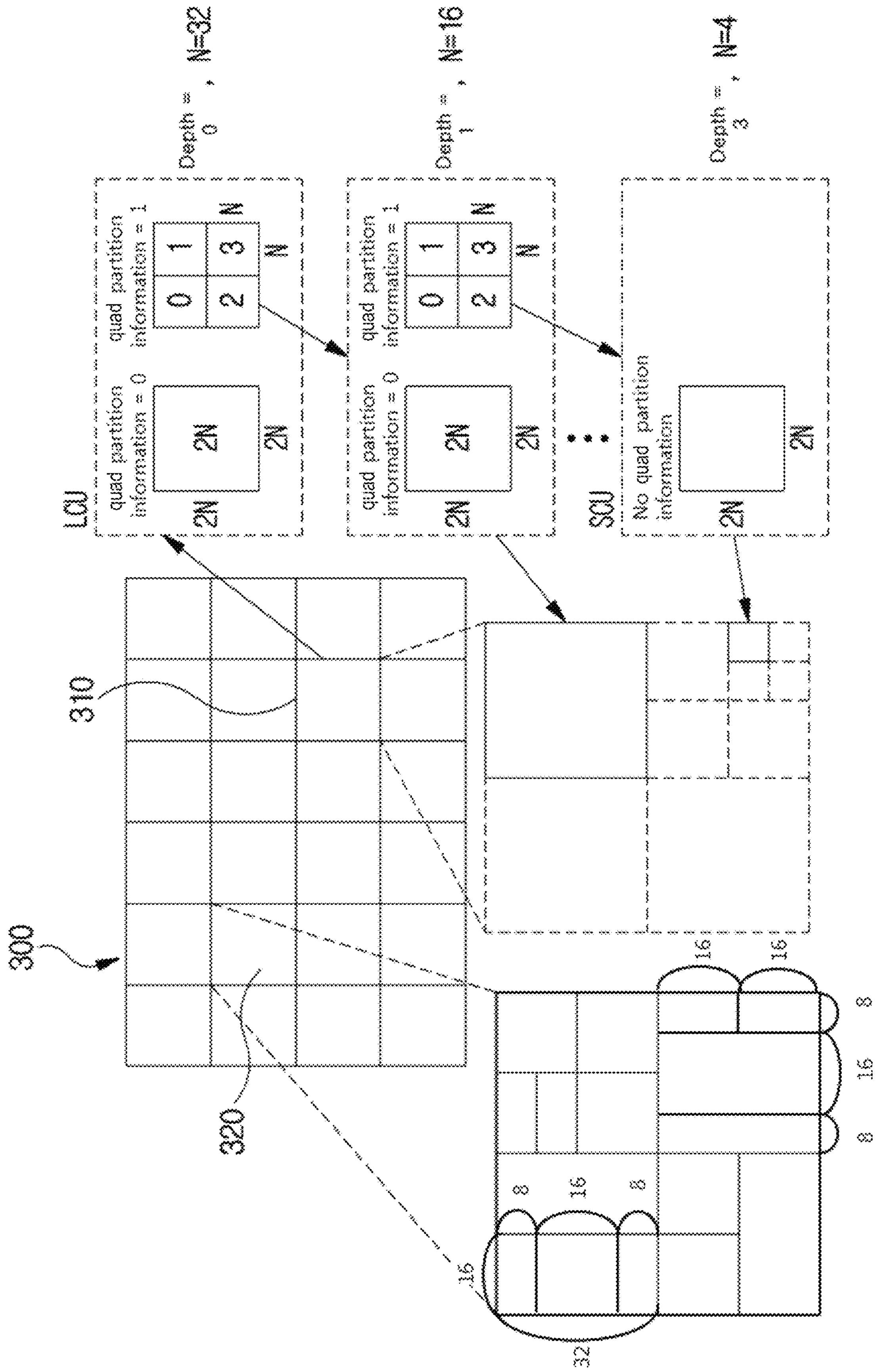
FIG. 3 is a diagram schematically illustrating a partitioning structure of an image when encoding and decoding the image according to an embodiment of the present invention.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
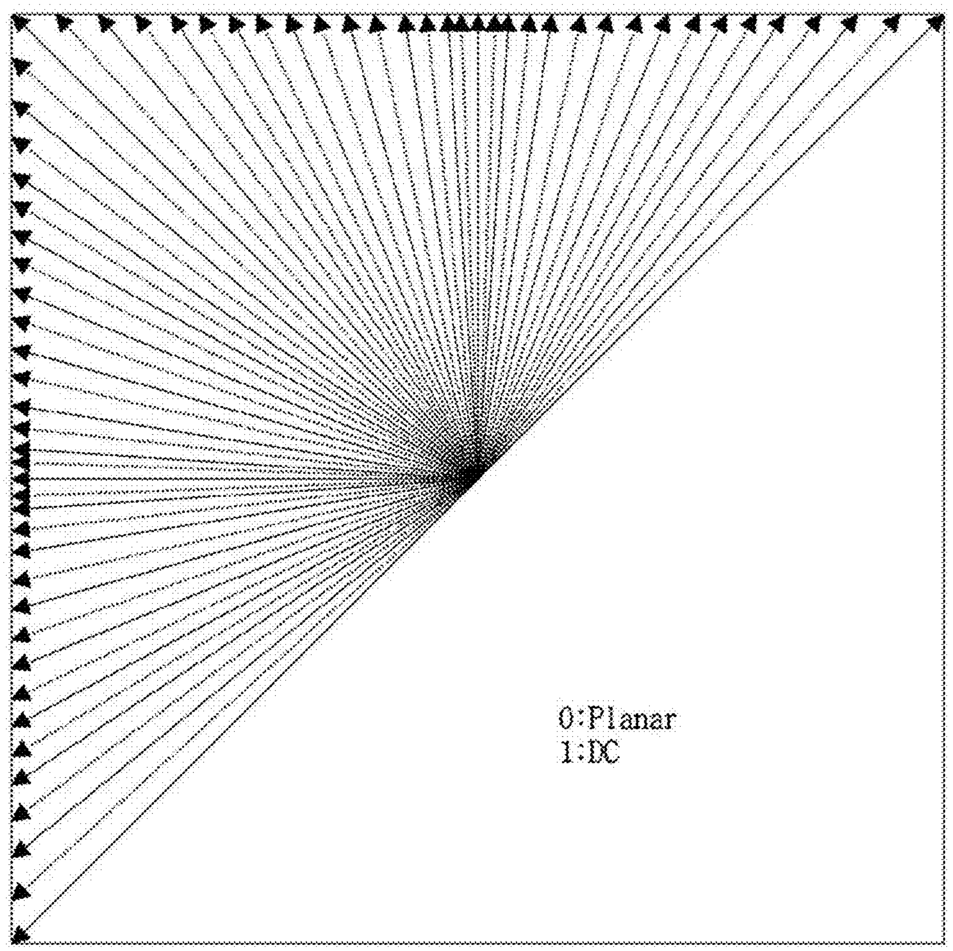
FIG. 4 is a diagram illustrating an example of an intra prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
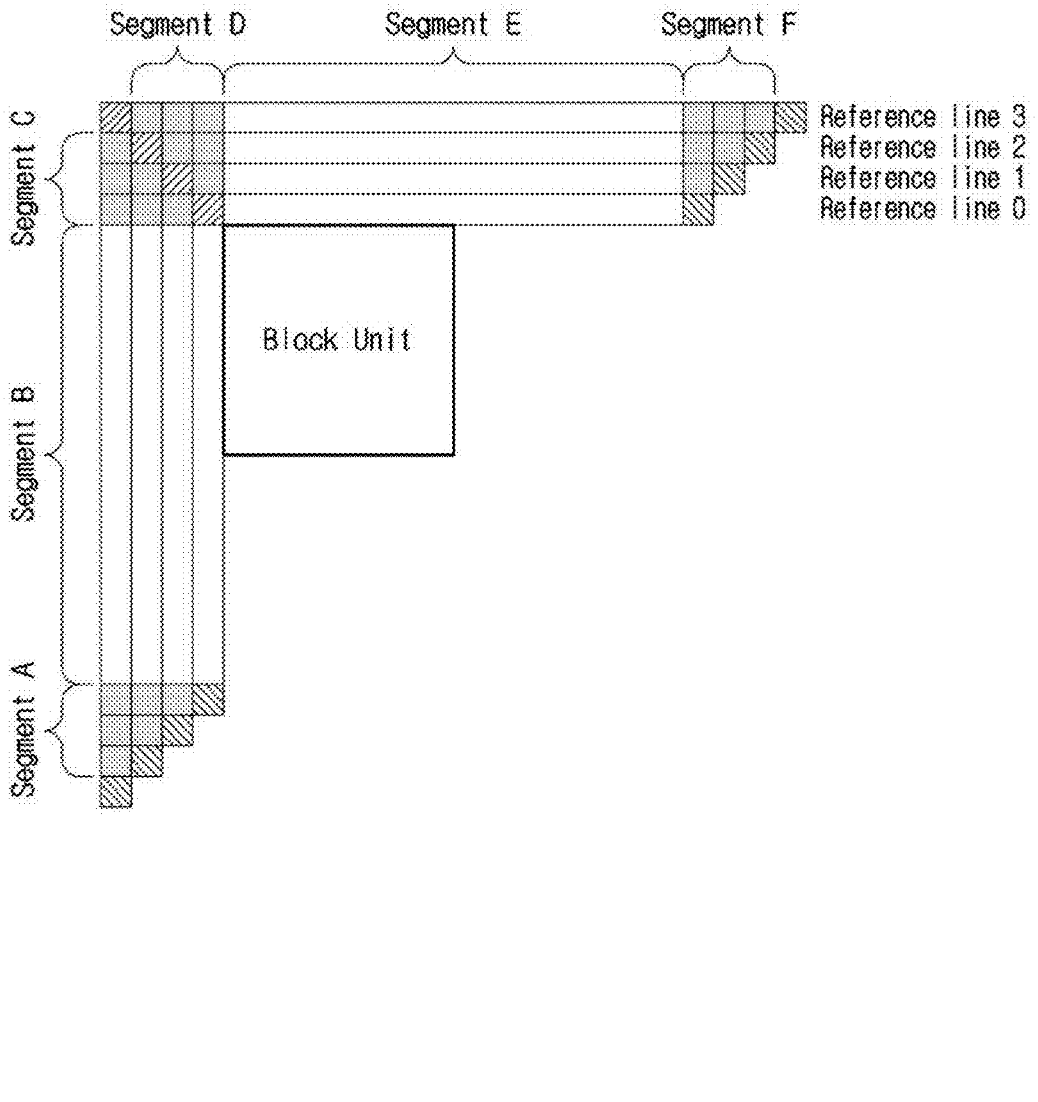
FIG. 7 is a diagram illustrating reference samples available for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
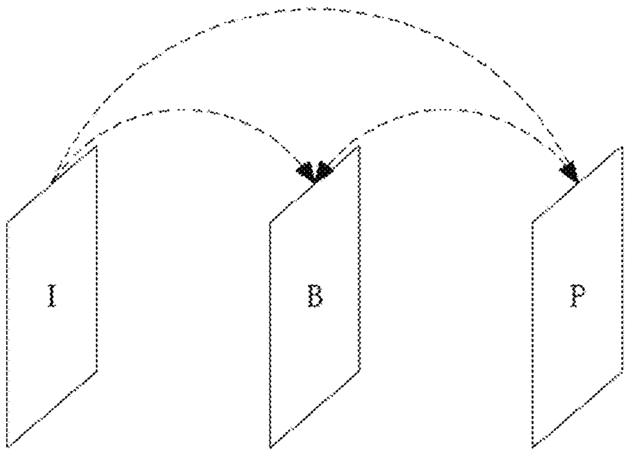
FIG. 5 is a diagram illustrating an example of an inter prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
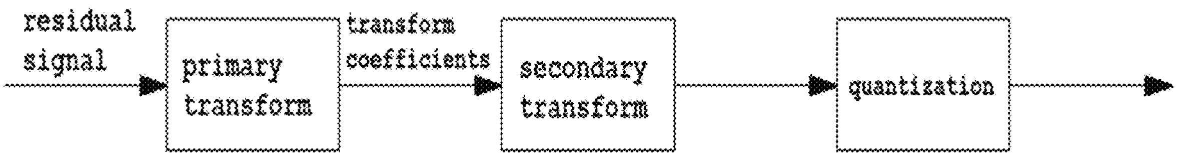
FIG. 6 is a diagram illustrating transform and quantization processes.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Figure 8:
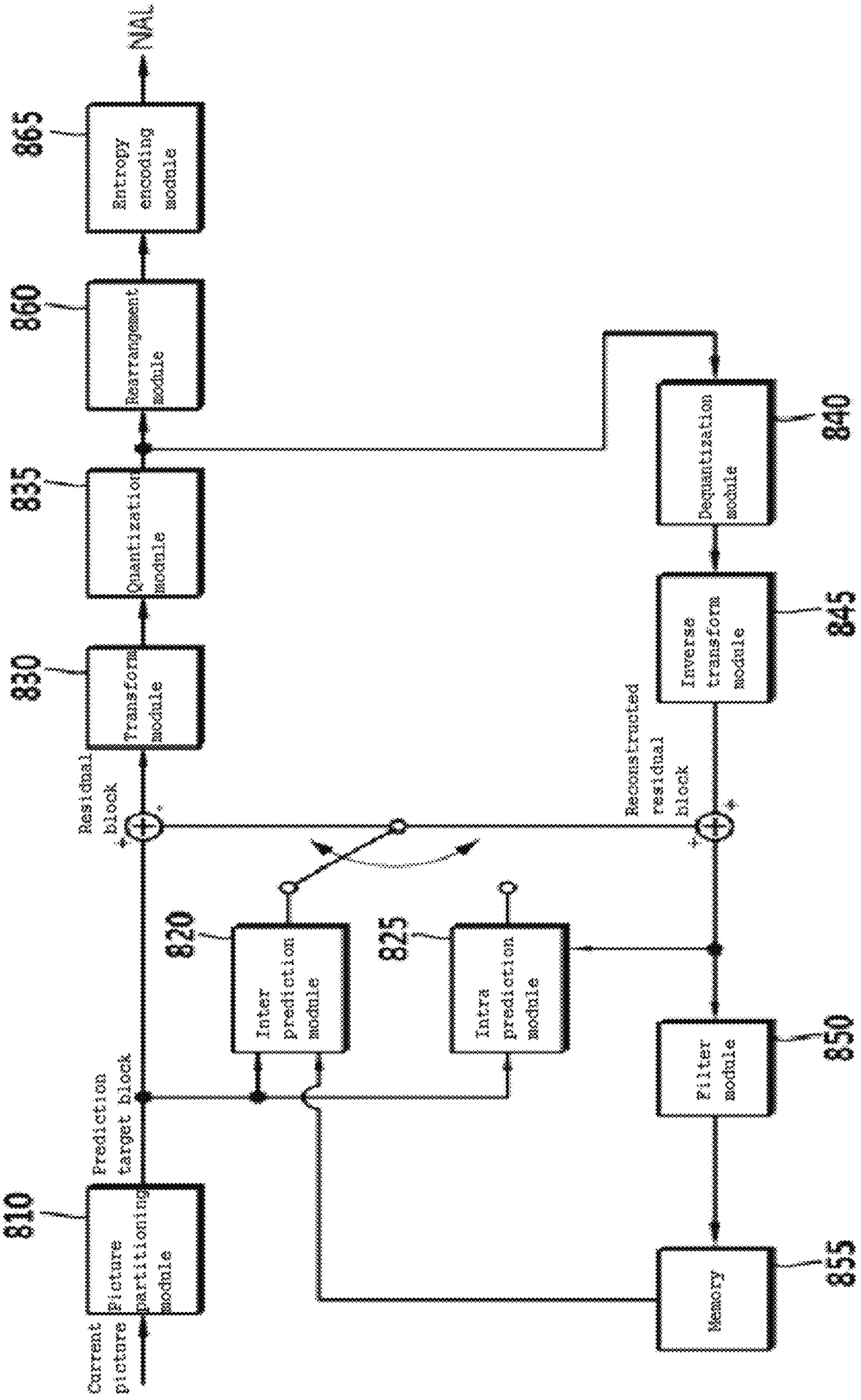
FIG. 8 is a block diagram illustrating a configuration according to another example of an encoding apparatus to which the present invention applies.

FIG. 8 is a block diagram illustrating a configuration according to another example of an encoding apparatus to which the present invention applies.

The encoding apparatus 800 may include a picture partitioning module 810, prediction modules 820 and 825, a transform module 830, a quantization module 835, a rearrangement module 860, an entropy encoding module 865, a dequantization module 840, an inverse transform module 845, a filter module 850, and/or a memory 855.

The constituents shown in FIG. 8 are independently shown so as to represent different distinctive functions in the image encoding apparatus, which may mean that each constituent is constituted as separated hardware. However, each constituent includes each of enumerated constituents for convenience. Thus, at least two constituents of each constituent may be combined to form one constituent or one constituent may be divided into a plurality of constituents to perform each function. The embodiment where each constituent is combined and the embodiment where one constituent is divided are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constituents for implementing the essence of the present invention except the constituents used in improving performance. The structure including only the indispensable constituents except the selective constituents used in improving only performance is also included in the scope of the present invention.

The picture partitioning module 810 may partition an input image into one or more blocks. Herein, the block may refer to a coding unit (CU), a prediction unit (PU), or a transform unit (TU). The partitioning may be performed on the basis of at least one among a quad tree, a binary tree, and a ternary tree. Quad-tree partitioning is a method of partitioning a parent block into four child blocks of which the width and the height are half of those of the parent block. Binary-tree partitioning is a method of partitioning a parent block into two child blocks of which either the width or the height is half of that of the parent block. In the binary tree, through the binary tree-based partitioning into the half of the height of the parent block, the block may be provided in a square shape as well as a non-square shape.

Hereinafter, in the embodiment of the present invention, the coding unit may refer to a unit of performing encoding or a unit of performing decoding.

The prediction modules 820 and 825 may include an inter prediction module 820 performing inter prediction and an intra prediction module 825 performing intra prediction. Whether to perform inter prediction or intra prediction on the prediction unit may be determined, and detailed information (for example, an intra prediction mode, a motion vector, a reference picture, and the like) depending on each prediction method may be determined. Herein, a processing unit on which prediction is performed may be different from a processing unit in which the prediction method and the detailed content are determined. For example, the prediction method, the prediction mode, and the like may be determined on a per-prediction unit basis, and prediction may be performed on a per-transform unit basis. A residual value (residual block) between the generated prediction block and an original block may be input to the transform module 830. Further, prediction mode information used for prediction, motion vector information, and the like may be encoded with the residual value by the entropy encoding module 865 and then may be transmitted to the decoding apparatus. When a particular encoding mode is used, the original block is intactly encoded and then transmitted to the decoding module without generating a prediction block by the prediction module 820, 825.

The inter prediction module 820 may predict the prediction unit on the basis of information on at least one among a previous picture and a subsequent picture of the current picture, or in some cases may predict the prediction unit on the basis of information on some encoded regions in the current picture. The inter prediction module 820 may include a reference picture interpolation module, a motion estimation module, and a motion compensation module.

The reference picture interpolation module may receive reference picture information from the memory 855 and may generate information on a pixel equal to or smaller than an integer pixel in the reference picture. In the case of a luma pixel, a DCT-based 8-tap interpolation filter having different filter coefficients may be used to generate information on a pixel equal to or smaller than an integer pixel on a per-¼ pixel basis. In the case of a chroma signal, a DCT-based 4-tap interpolation filter having different filter coefficients may be used to generate information on a pixel equal to or smaller than an integer pixel on a per-⅛ pixel basis.

The motion estimation module may perform motion estimation on the basis of the reference picture interpolated by the reference picture interpolation module. As methods of calculating the motion vector, various methods, such as a full search-based block matching algorithm (FBMA), a three step search (TSS) algorithm, a new three-step search (NTS) algorithm, and the like, may be used. The motion vector may have a motion vector value on a per-½ or ¼ pixel basis on the basis of the interpolated pixel. The motion estimation module may predict a current prediction unit by using different motion estimation methods. As motion estimation methods, various methods, such as a skip method, a merge method, an advanced motion vector prediction (AMVP) method, and the like, may be used.

The intra prediction module 825 may generate a prediction unit on the basis of information on a reference pixel around a current block, which is information on the pixel in the current picture. When the neighboring block of the current prediction unit is a block subjected to inter prediction and thus a reference pixel is a pixel subjected to inter prediction, the information on the reference pixel of the neighboring block subjected to intra prediction is used instead of the reference pixel included in the block subjected to inter prediction. That is, when the reference pixel is unavailable, at least one reference pixel among available reference pixels is used instead of information on the unavailable reference pixel.

Prediction modes in intra prediction may include an angular prediction mode using the information on the reference pixel depending on a prediction direction and a non-angular prediction mode not using direction information in performing prediction. A mode for predicting a luma component may be different from a mode for predicting a chroma component, and the chroma component may be predicted using the intra prediction mode used for predicting the luma component or using a predicted/reconstructed luma component.

In the intra prediction method, a prediction block may be generated after applying an adaptive intra smoothing (AIS) filter to a reference pixel depending on the intra prediction modes. The type of AIS filter applied to the reference pixel may vary. In order to perform the intra prediction method, an intra prediction mode of the current prediction unit may be predicted from the intra prediction mode of the prediction unit presenting around the current prediction unit. In the case where the prediction mode of the current prediction unit is predicted using mode information predicted from the neighboring prediction unit, when the intra prediction mode of the current prediction unit and the intra prediction mode of the neighboring prediction unit are the same, information that the intra prediction mode of the current prediction unit and the intra prediction mode of the neighboring prediction unit are the same is transmitted using predetermined flag information. When the intra prediction mode of the current prediction unit is different from the intra prediction mode of the neighboring prediction unit, entropy encoding is performed to encode intra prediction mode information of the current block.

Further, the residual block including information on the residual value, which is the difference value between the prediction unit generated by the prediction module 820, 825 and the original block, may be generated. The generated residual block may be input to the transform module 830.

The transform module 830 may transform a residual block including residual data by using a transform type, such as DCT, DST, or the like. Herein, the transform type may be determined on the basis of the intra prediction mode of the prediction unit used for generating the residual block.

The quantization module 835 may quantize the values transformed into a frequency domain by the transform module 830. Quantization coefficients may vary according to a block or importance of an image. The value calculated by the quantization module 835 may be provided to the dequantization module 840 and the rearrangement module 860.

The rearrangement module 860 may perform rearrangement of coefficient values with respect to the quantized residual block. The rearrangement module 860 may change a coefficient in the form of a two-dimensional block into a coefficient in the form of a one-dimensional vector through a coefficient scanning method. For example, the rearrangement module 860 may scan coefficients from a DC coefficient to a coefficient in a high frequency domain by using a predetermined scan type so as to change the coefficients to be in the form of a one-dimensional vector.

The entropy encoding module 865 may perform entropy encoding on the basis of the values calculated by the rearrangement module 860. Entropy encoding may use various encoding methods, for example, exponential Golomb coding, context-adaptive variable length coding (CAVLC), and context-adaptive binary arithmetic coding (CABAC).

The entropy encoding module 865 may encode a variety of information, such as residual coefficient information and block type information of the coding unit, prediction mode information, partitioning unit information, prediction unit information, transmission unit information, motion vector information, reference frame information, block interpolation information, filtering information, and the like from the rearrangement module 860 and the prediction modules 820 and 825.

The entropy encoding module 865 may entropy encode the coefficient values of the coding unit input from the rearrangement module 860.

The dequantization module 840 dequantizes the values quantized by the quantization module 835, and the inverse transform module 845 inverse transforms the values transformed by the transform module 830. The residual value generated by the dequantization module 840 and the inverse transform module 845 may be combined with the prediction unit predicted through a motion estimation module included in the prediction module 820, 825, the motion compensation module, and the intra prediction module such that a reconstructed block may be generated.

The filter module 850 may include at least one among a deblocking filter, an offset correction module, and an adaptive loop filter (ALF).

The deblocking filter may remove block distortion that occurs due to boundaries between the blocks in the reconstructed picture. In order to determine whether to perform deblocking, whether to apply the deblocking filter to the current block may be determined on the basis of the pixels included in several columns or rows in the block. When the deblocking filter is applied to the block, a strong filter or a weak filter is applied depending on required deblocking filtering strength. Further, in applying the deblocking filter, when performing horizontal direction filtering and vertical direction filtering, horizontal direction filtering and vertical direction filtering are configured to be processed in parallel.

The offset correction module may correct an offset from the original image on a per-pixel basis with respect to the image subjected to deblocking. In order to perform offset correction on a particular picture, it is possible to use a method of separating pixels of the image into the predetermined number of regions, determining a region to be subjected to offset, and applying the offset to the determined region, or a method of applying an offset considering edge information of each pixel.

Adaptive loop filtering (ALF) may be performed on the basis of the value obtained by comparing the filtered reconstructed image and the original image. The pixels included in the image may be divided into predetermined groups, a filter to be applied to each of the groups may be determined, and filtering may be individually performed on each group. Information on whether to apply ALF and a luma signal may be transmitted for each coding unit (CU), and the shape and the filter coefficient of the ALF filter to be applied may vary depending on each block. Also, regardless of the characteristic of the application target block, the ALF filter in the same form (fixed form) may be applied.

The memory 855 may store the reconstructed block or picture calculated through the filter module 850, and the stored reconstructed block or picture may be provided to the prediction module 820, 825 when performing inter prediction.

Figure 9:
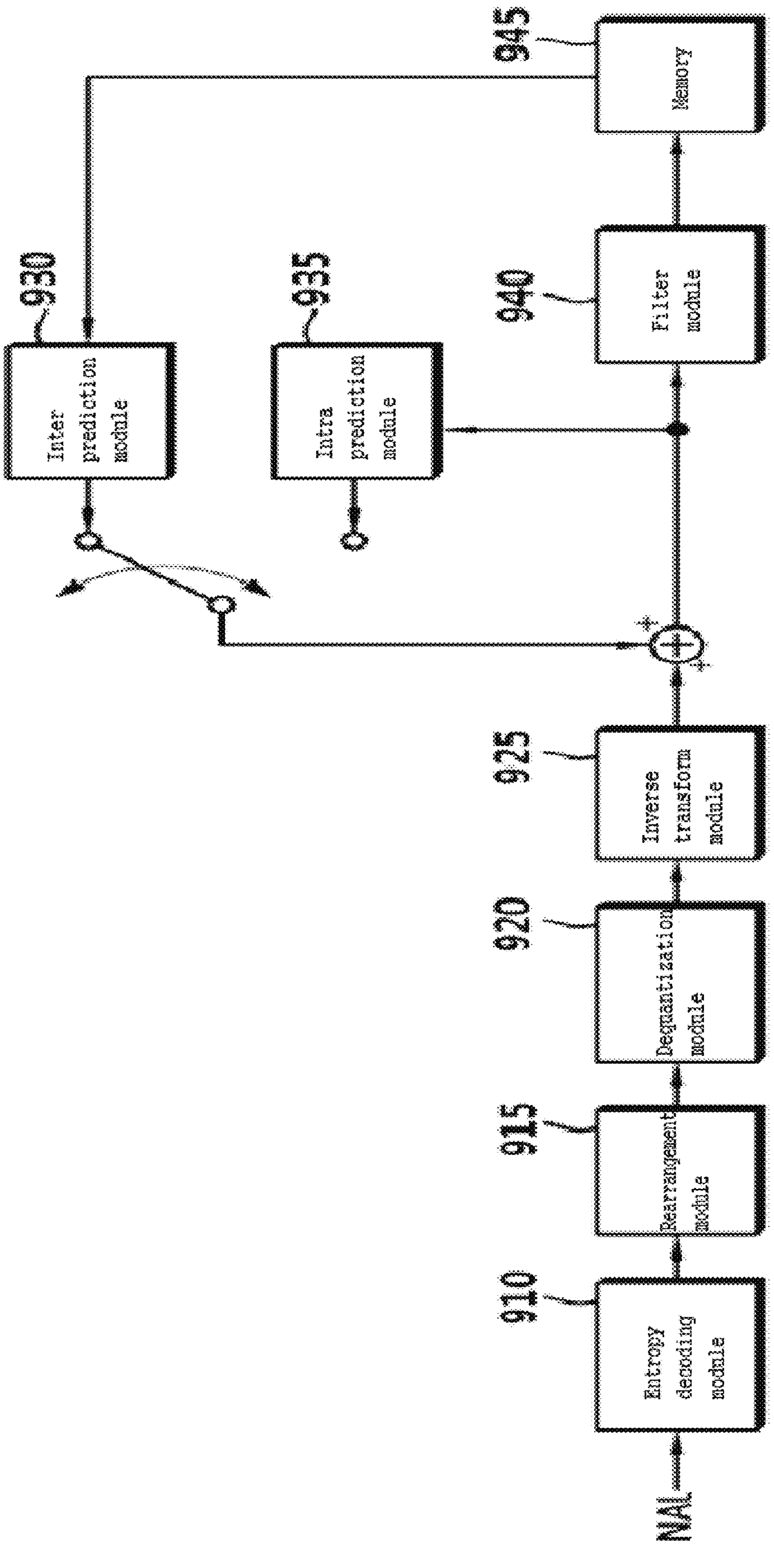
FIG. 9 is a block diagram illustrating a configuration according to another example of a decoding apparatus to which the present invention applies.

FIG. 9 is a block diagram illustrating a configuration according to another example of a decoding apparatus to which the present invention applies.

The decoding apparatus 900 may include an entropy decoding module 910, a rearrangement module 915, a dequantization module 920, an inverse transform module 925, prediction modules 930 and 935, a filter module 940, and a memory 945.

The constituents shown in FIG. 9 are independently shown so as to represent different distinctive functions in the decoding apparatus, which may mean that each constituent is constituted as separated hardware. However, each constituent includes each of enumerated constituents for convenience. Thus, at least two constituents of each constituent may be combined to form one constituent or one constituent may be divided into a plurality of constituents to perform each function. The embodiment where each constituent is combined and the embodiment where one constituent is divided are also included in the scope of the present invention, if not departing from the essence of the present invention.

The entropy decoding module 910 may perform entropy decoding on the input bitstream. For example, for entropy decoding, various methods, such as exponential Golomb coding, context-adaptive variable length coding (CA VLC), context-adaptive binary arithmetic coding (CABAC), may be applied.

The entropy decoding module 910 may decode information related to intra prediction and inter prediction performed in the encoding apparatus.

The rearrangement module 915 may perform rearrangement on the bitstream entropy decoded by the entropy decoding module 910. The coefficients expressed in the form of the one-dimensional vector may be reconstructed into the coefficients in the form of the two-dimensional block for rearrangement. The rearrangement module 915 may perform rearrangement through a method of receiving information related to coefficient scanning performed in the encoding apparatus and of inversely scanning on the basis of the scanning order performed in the encoding apparatus.

The dequantization module 920 may perform dequantization on the basis of a quantization parameter and the rearranged coefficient values of the block.

The inverse transform module 925 may inverse transform the dequantized transform coefficient into a predetermined transform type. Herein, the transform type may be determined on the basis of at least one piece of information among information on the prediction mode (inter/intra prediction), the size/shape of the block, the intra prediction mode, the component type (luma/chroma component), the partitioning type (QT, BT, TT, etc.), and the like.

The prediction module 930, 935 may generate a prediction block on the basis of information related to prediction block generation provided from the entropy decoding module 910 and of information on the previously decoded block or picture provided from the memory 945.

The prediction modules 930 and 935 may include a prediction unit determination module, an inter prediction module, and an intra prediction module. The prediction unit determination module may receive a variety of information input from the entropy decoding module 910, such as prediction unit information, information related to the intra prediction mode of the intra prediction method, information related to motion estimation of the inter prediction method, and the like, may separate the prediction unit in the current coding unit (CU), and may determine whether inter prediction is performed on the prediction unit or intra prediction is performed on the prediction unit. By using information required for inter prediction of the current prediction unit provided from the encoding apparatus, the inter prediction module 930 may perform inter prediction on the current prediction unit on the basis of information included at least one picture among the previous picture and the subsequent picture of the current picture including the current prediction unit. Alternatively, inter prediction may be performed on the basis of information on some pre-reconstructed regions in the current picture including the current prediction unit. To this end, the pre-reconstructed regions may be added to a reference picture list.

In order to perform inter prediction, on the basis of the coding unit, it may be determined which mode among a skip mode, a merge mode, an AMVP mode, and a current picture reference mode is used for the motion estimation method of the prediction unit included in the coding unit.

The intra prediction module 935 may generate a prediction block on the basis of information on the pixel within the current picture. When the prediction unit is a prediction unit subjected to intra prediction, intra prediction is performed on the basis of intra prediction mode information of the prediction unit provided from the encoding apparatus. The intra prediction module 935 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. By using the prediction mode of the prediction unit provided from the encoding apparatus and the AIS filter information, AIS filtering may be performed on the reference pixel of the current block. When the prediction mode of the current block is a mode in which AIS filtering is not performed, the AIS filter is not applied.

When the prediction mode of the prediction unit is a prediction mode in which intra prediction is performed on the basis of a pixel value obtained by interpolating the reference pixel, the reference pixel interpolation module interpolates the reference pixel to generate a reference pixel based on a pixel of an integer value or less. When the prediction mode of the current prediction unit is a prediction mode in which a prediction block is generated without interpolating the reference pixel, the reference pixel is not interpolated. The DC filter generates the prediction block through filtering when the prediction mode of the current block is a DC mode.

The reconstructed block or picture may be provided to the filter module 940. The filter module 940 may include a deblocking filter, an offset correction module, and an ALF.

From the encoding apparatus, it is possible to receive information on whether or not the deblocking filter is applied to the block or picture and information on whether the strong filter is applied or the weak filter is applied when the deblocking filter is applied. The deblocking filter of the decoding apparatus may receive information related to the deblocking filter from the encoding apparatus, and the decoding apparatus may perform deblocking filtering on the block.

The offset correction module may perform offset correction on the reconstructed image on the basis of the type of offset correction, offset value information, and the like applied to the image in performing encoding.

The ALF may be applied to the coding unit on the basis of information on whether to apply the ALF, ALF coefficient information, and the like provided from the encoder. The ALF information may be provided, being included in a particular parameter set.

The memory 945 may store the reconstructed picture or block for use as a reference picture or a reference block, and may provide the reconstructed picture to an output module.

Figure 10:
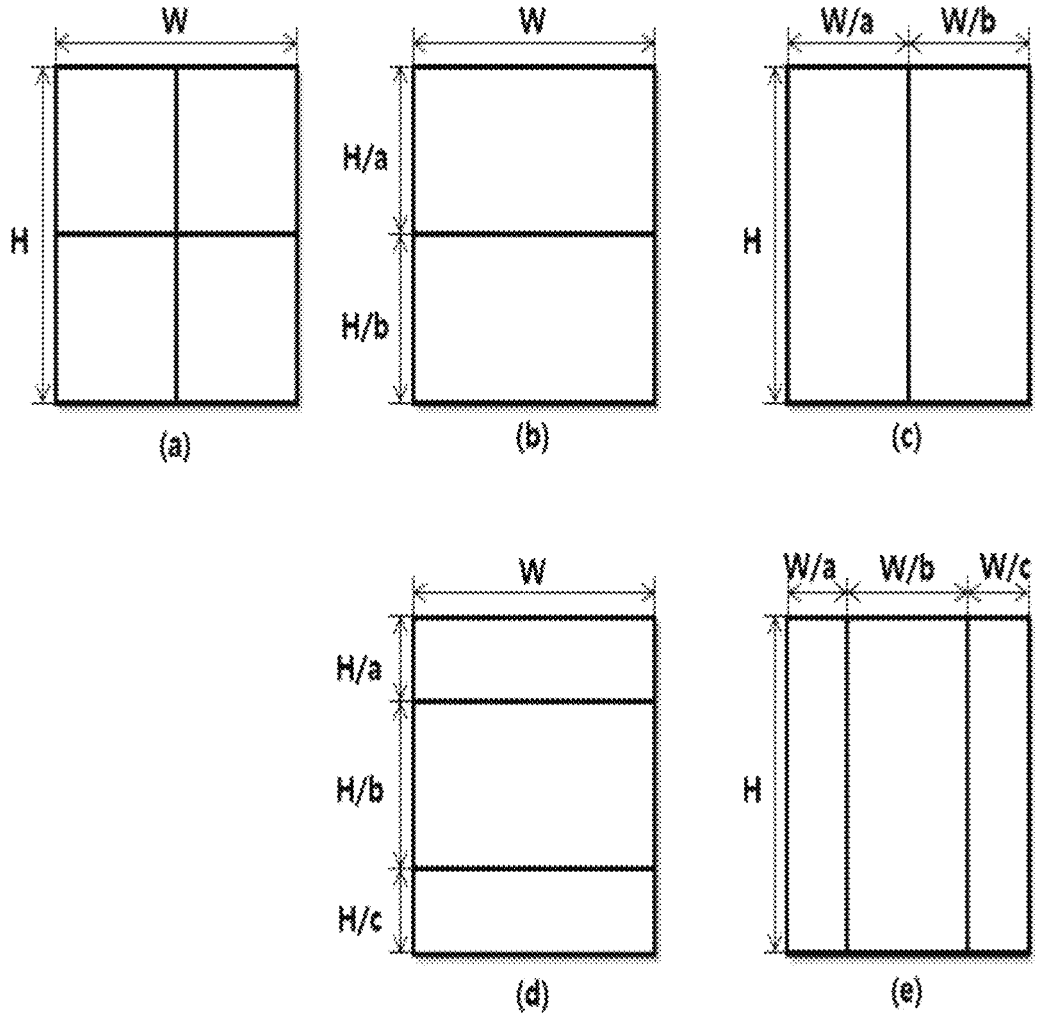
FIG. 10 is a diagram schematically illustrating a partitioning structure of an image when encoding and decoding the image according to another embodiment of the present invention.

FIG. 10 is a diagram schematically illustrating a partitioning structure of an image when encoding and decoding the image according to another embodiment of the present invention.

One block (hereinafter, referred to as a first block) may be partitioned into multiple subblocks (hereinafter, referred to as a second block) by at least one among a vertical line and a horizontal line. There are one, two, or more vertical lines and horizontal lines. Herein, the first block may be a coding block (CU) which is a basic unit of image encoding/decoding, a prediction block (PU) which is a basic unit of prediction encoding/decoding, or a transform block (TU) which is a basic unit of transform encoding/decoding. The first block may be a square block or a non-square block.

Partitioning of the first block may be performed on the basis of a quad tree, a binary tree, a ternary tree, and the like, and this will be described in detail with reference to FIG. 10.

FIG. 10(*a*) shows quad-tree (QT) partitioning. The QT is a partitioning type in which the first block is partitioned into four second blocks. For example, when the first block in a 2N×2N size is partitioned through the QT, the first block is partitioned into four second blocks, each having an N×N size. The QT may be limited to be applied only to a square block, but may be applied to a non-square block.

FIG. 10(*b*) shows horizontal binary-tree (hereinafter, referred to as horizontal BT) partitioning. The horizontal BT is a partitioning type in which the first block is partitioned into two second blocks by one horizontal line. The partitioning into two pieces may be performed symmetrically or asymmetrically. For example, when the first block in a 2N×2N size is partitioned through the horizontal BT, the first block is partitioned into two second blocks having a height ratio of (a:b). Herein, a and b may be the same value, or a may be larger or smaller than b.

FIG. 10(*c*) shows vertical binary-tree (hereinafter, referred to as vertical BT) partitioning. The vertical BT is a partitioning type in which the first block is partitioned into two second blocks by one vertical line. The partitioning into two pieces may be performed symmetrically or asymmetrically. For example, when the first block in a 2N×2N size is partitioned through the vertical BT, the first block is partitioned into two second blocks having a width ration of (a: b). Herein, a and b may be the same value, or a may be larger or smaller than b.

FIG. 10(*d*) shows horizontal ternary-tree (hereinafter, referred to as horizontal TT) partitioning. The horizontal TT is a partitioning type in which the first block is partitioned into three second blocks by two horizontal lines. For example, when the first block in a 2N×2N size is partitioned through the horizontal TT, the first block is partitioned into three second blocks having a height ratio of (a:b:c). Herein, a, b, and c may be the same value. Alternatively, a and c may be the same, and b may be larger or smaller than a.

FIG. 10(*c*) shows vertical ternary-tree (hereinafter, referred to as vertical TT) partitioning. The vertical TT is a partitioning type in which the first block is partitioned into three second blocks by two vertical lines. For example, when the first block in a 2N×2N size is partitioned through the vertical TT, the first block is partitioned into three second blocks having a width ratio of (a:b:c). Herein, a, b, and c may be the same value, or may be different values. Alternatively, a and c may be the same, and b may be larger or smaller than a. Alternatively, a and b may be the same, and c may be larger or smaller than a. Alternatively, b and c may be the same, and a may be larger or smaller than b.

The above-described partitioning may be performed on the basis of partitioning information signaled from the encoding apparatus. The partitioning information may include at least one among partitioning type information, partitioning direction information, and partitioning ratio information.

The partitioning type information may specify any one of the pre-defined partitioning types in the encoder/decoder. The pre-defined partitioning type may include at least one among the QT, the horizontal BT, the vertical BT, the horizontal TT, the vertical TT, and a non-partitioning mode (no split). Alternatively, the partitioning type information may refer to information on whether the QT, the BT, or the TT is applied, which may be encoded in the form of a flag or an index. The partitioning direction information may indicate, in the case of the BT or the TT, whether the partitioning is performed in the horizontal direction or in the vertical direction. The partitioning ratio information may indicate, in the case of the BT or the TT, the width and/or height ratio of the second blocks.

Figure 11:
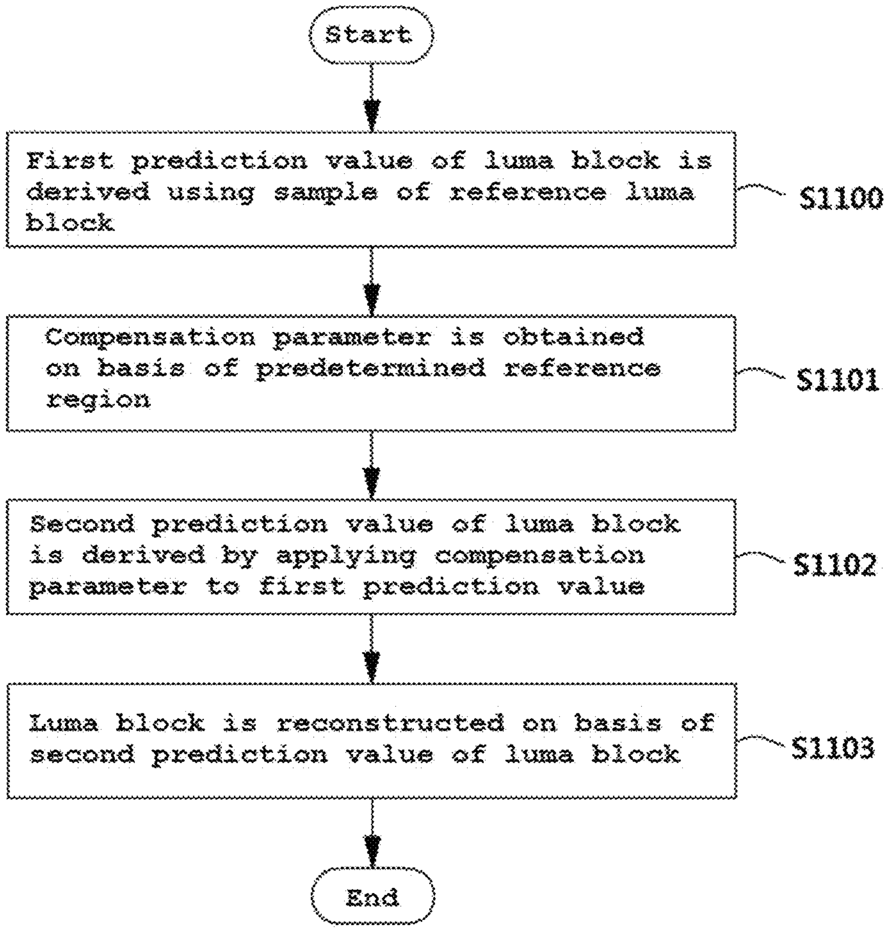
FIG. 11 is a flowchart illustrating an operation of an image encoding/decoding method according to an embodiment of the present invention.

FIG. 11 is a flowchart illustrating an operation of an image encoding/decoding method according to an embodiment of the present invention.

Referring to FIG. 11, a process of performing motion compensation and reconstructing a luma block by using local illumination compensation is shown.

In the meantime, reconstruction based on local illumination compensation may mean predicting/reconstructing the luma component (hereinafter, referred to as a luma block) of the current block on the basis of the luma component (hereinafter, referred to as a reference luma block) of the reference block.

At step S1100, a first prediction value of the luma block may be derived using a sample of the reference luma block.

For example, the first prediction value may be set to a sample value of the reference luma block corresponding to the position of the first prediction value of the luma block.

As another example, the first prediction value may be derived by performing filtering on the reference luma block.

The filtering may be performed on the basis of filtering of an upsampling filter, a band pass filter, an ALF, an SAO, a deblocking filter, or the like. Further, the form of the filtering may have a linear or non-linear form. Further, the filtering may be performed by executing an operation according to a predetermined equation or by using a mapping table pre-calculated using the equation. That is, regarding the filtering, a mapping process using the mapping table may be performed.

The mapping table may include at least one among a first table in which a prediction value of a first domain is mapped to a prediction value of a second domain and a second table in which the prediction value of the second domain is mapped to the prediction value of the first domain. Herein, the first domain may refer to an original domain, and the second domain may refer to a reshaped domain. Alternatively, the first domain may refer to a reshaped domain, and the second domain may refer to an original domain. The first table and the second table may correspond to each other. For example, the first table and the second table may have an inverse function relationship with each other. Alternatively, the tables may have a relationship symmetrical to an equation, y=x.

For example, information on the mapping table may be pre-established in the encoder/decoder, and may be encoded by the encoder for signaling to the decoder.

The information on the mapping table may include a first table value, a second table value, information on whether the mapping table is applied, and the like. The information on the mapping table may be signaled in an adaptation parameter set.

As another example, either one of the first table or the second table may be signaled, and the other one may be derived by the decoder on the basis of the signaled table.

As still another example, the mapping table may be shared in intra prediction and/or inter prediction, or different mapping tables may be applied depending on the prediction mode.

As still another example, in intra prediction, it is limited to use only one among the first table and the second table. In inter prediction, both the first table and the second table are used, or another table different from that in intra prediction may be used.

As still another example, an index identifying any one of multiple mapping tables may be used, and the mapping tables may be selectively used on the basis of the indexes. The index may be signaled in the encoder and may be set to a pre-defined value in the decoder depending on the prediction mode of the luma block.

The sample of the reference luma block may be a prediction value or a reconstruction value. The prediction value may be obtained through intra prediction and/or inter prediction. The reconstruction value may be a first value obtained by adding a residual sample to the prediction value, or may be a second value obtained by applying an in-loop filter to the first value.

At step S1101, a compensation parameter may be obtained on the basis of a predetermined reference region.

The reference region may refer to a region that is referenced to calculate a local illumination compensation parameter (hereinafter, referred to as a "compensation parameter") of the luma/chroma block. A method of determining the reference region will be described later in detail with reference to FIGS. 12 to 13.

The reference region may include at least one among a reference region (hereinafter, referred to as a "reference luma reference region") of the reference luma block and a reference region (hereinafter, referred to as a "current luma reference region") of the current luma block. Further, the reference region may be a pre-reconstructed region adjacent to the surround of the block. Herein, the pre-reconstructed region may be a reconstructed region before the in-loop filter is applied or a reconstructed region after the in-loop filter is applied.

The reference block may belong to the same picture (hereinafter, referred to as a "current picture") as the current luma block or may belong to a picture (hereinafter, referred to as a "reference picture") in a time zone different from that of the current luma block.

The reference picture may be a picture pre-established in the encoder/decoder. For example, when the current picture has a picture order count value of n in the encoding/decoding order, the reference picture is determined to be a picture that has a picture order count value of (n−1) in the encoding/decoding order. Alternatively, when the current picture has a picture order count (POC) value of n in the output order, the reference picture is determined to be a picture that has a picture order count value of (n−1) in the output order. Further, the reference picture may be determined on the basis of information that is signaled after encoded in the encoding apparatus. The information may be an index specifying a picture that is referenced for local illumination compensation.

The compensation parameter may be obtained on the basis of at least one among a representative value of the reference luma reference region and a representative value of the current luma reference region.

For example, the compensation parameter may be obtained on the basis of a linear relationship between the reference region and the block.

As another example, the linear relationship between the representative value of the reference luma reference region and the reference luma block may be the same/similar to the linear relationship between the representative value of the current luma reference region and the luma block. The compensation parameter may be calculated on the basis of the same/similar relationship.

In the meantime, the compensation parameter may be calculated in the form of at least one among a weighting factor, an offset, and a filter coefficient.

The representative value of the reference luma reference region may be derived using all or a part of the samples belonging to the reference luma reference region.

For example, the position of the part of the samples is pre-established in the encoder/decoder. For example, the position of the part of the samples may be a position adjacent to at least one among the left, the top, and the top left of the top left sample of the reference luma block.

As another example, the position of the part of the samples may be determined depending on the position of the sample of the reference luma block. For example, the position of the part of the samples may be the same x coordinate or y coordinate as that of the sample of the reference luma block.

As still another example, the position of the part of the samples may be determined depending on the position of the pixel interpolated considering the motion vector of the luma block. For example, the luma block has a motion vector as a result of motion estimation, and the motion vector may be present on the basis of a ½ pixel, a ¼ pixel, a ⅛ pixel, a 1/16 pixel, or a 1/32 pixel. The motion vector may correspond to an interpolation position of the reference luma block predicted from the reference luma block. Therefore, the position of the sample of the reference luma block may be determined by a sample interpolation technique. In the meantime, the interpolation position may be determined according to the value of the motion vector.

The number of the part of the samples may be one, two, three, four, five, or more. The number may be a fixed value pre-established in the encoder/decoder, or may be determined variably considering the position of the sample of the reference luma block, the unit of the motion vector, the size/shape of the luma block, or the like.

As still another example, the position of the part of the samples may be determined depending on the intra prediction mode of the reference luma block. For example, the intra prediction mode may be represented by a line (angular line) with a predetermined angle. Herein, the part of the samples may be positioned on the same angular line as the sample of the reference luma block. In the case where an integer sample (integer pel) is not present on the angular line, an integer sample positioned on the both sides of the angular line may be used as the part of the samples.

As still another example, the part of the samples may be determined through a combination of the above-described embodiments.

The number of the part of the samples may be one, two, three, four, five, or more. The number may be a fixed value pre-established in the encoder/decoder, or may be determined variably considering the position of the sample of the reference luma block, whether or not the intra prediction mode is the non-angular mode, the angle of the angular mode, the size/shape of the luma block, or the like.

The representative value may be derived to be the average value, the minimum value, the maximum value, the mode value, or the median value of all or a part of the samples belonging to the reference luma reference region. Alternatively, the representative value may be derived by applying a predetermined filter to all or a part of the samples belonging to the reference luma reference region. The filter may be pre-defined in the encoder/decoder. The number of the pre-defined filters may be one, two, or more. Considering the size/shape of the luma block, the prediction mode, the information on the intra prediction mode, the filter strength, or the like, any one of the multiple filters may be selectively used. Any one of the multiple filters and another filter may differ in at least one among filter length, filter strength, and filter coefficient. The information on the intra prediction mode may include information on whether the intra prediction mode is the non-angular mode, whether the intra prediction mode is a vertical/horizontal mode, the direction of the intra prediction mode, the number of intra prediction modes pre-defined in the encoder/decoder, and the like.

The representative value of the current luma reference region may also be described in the same/similar manner to the representative value of the luma reference region, so that a detailed description will be omitted.

At step S1102, by applying the compensation parameter calculated at step S1101 to the first prediction value derived at step S1100, a second prediction value of the luma block may be derived.

As described above, the compensation parameter may be calculated in the form of a weighting factor and/or an offset. Herein, the second prediction value of the luma block may be derived by multiplying the weighting factor and the first prediction value, or may be derived by adding or subtracting the offset from the first prediction value. Alternatively, the second prediction value of the luma block may be derived by multiplying the weighting factor and the first prediction value and then by adding or subtracting the offset from the resulting value.

Alternatively, the compensation parameter may be calculated in the form of a filter coefficient of an n-tap filter. Input values of the n-tap filter may include at least one among the first prediction value (or the sample of the reference luma block), the representative value of the reference luma reference region, and the representative value of the current luma reference region. An output value of the n-tap filter may be the second prediction value of the luma block.

At step S1103, the luma block may be reconstructed on the basis of the second prediction value of the luma block derived at step S1102.

For example, the second prediction value may be set to a reconstruction value of the current luma block. That is, in the case of prediction based on local illumination compensation, the decoding apparatus may omit a process of decoding a residual sample.

As another example, even in the case of prediction based on local illumination compensation, the reconstruction value of the luma block may be generated by adding the residual sample to the second prediction value of the luma block.

Whether to perform prediction based on local illumination compensation may be determined according to a predetermined condition.

For example, the prediction may be selectively performed on the basis of information signaled from the encoder. The information may indicate whether the luma block is decoded through prediction based on local illumination compensation, and may be signaled in the form of a flag or an index.

As another example, on the basis of predetermined encoding information, whether the luma block is decoded through prediction based on local illumination compensation may be determined. Herein, the encoding information may include information encoded by the encoder and signaled as well as information derived by the decoder on the basis of the signaled information. For example, examples of the encoding information may include the size/shape of the block, availability of the block, the partitioning type, the number of times that partitioning is performed, the component type, the prediction mode, information on the intra prediction mode, the inter mode, the motion information, the transform type, the transform skip mode, information on a non-zero residual coefficient, the scanning order, the color format, the in-loop filter information, or the like.

The size of the block may be represented by any one of the width and the height, the minimum value/maximum value among the width and the height, the sum of the width and the height, the number of samples belonging to the block, or the like.

The availability of the block may be determined considering the position of the block, a range of a parallel processing region, the decoding order, or the like.

The prediction mode may refer to information indicating the intra mode or the inter mode.

The information on the intra prediction mode may include information on whether the intra prediction mode is the non-angular mode, whether the intra prediction mode is the vertical/horizontal mode, the direction of the intra prediction mode, the number of intra prediction modes pre-defined in the encoder/decoder, or the like.

The inter mode may refer to information indicating the merge/skip mode, the AMVP mode, or the current picture reference mode. The current picture reference mode may refer to a method of predicting the current block by using a pre-reconstructed region of the current picture. The current picture may be a picture to which the current block belongs. The current picture may be added to a reference picture list for inter prediction, and the current picture may be placed after a short-term reference picture or a long-term reference picture within the reference picture list.

The motion information may include a prediction direction flag, a motion vector, a reference picture index, or the like.

The encoding information may relate to the current block and/or the neighboring block.

As still another example, only when the reference luma block satisfies a particular condition, prediction based on local illumination compensation is performed. Herein, examples of the particular condition may include the cases where the luma block is encoded in the intra mode, where the intra prediction mode of the luma block is the non-angular mode, where the intra prediction mode of the luma block is the vertical/horizontal mode, where the size of the luma block is equal to or smaller than a predetermined threshold value, where the luma block is encoded in the merge/skip mode, where the residual coefficient of the luma block is 0 (e.g., coded_block_flag=0), where the number of the non-zero residual coefficients belonging to the luma block is equal to or smaller than a predetermined threshold value, where the in-loop filter information (e.g., deblocking filter, SAO, ALF) of the luma block is derived from the in-loop filter information of the neighboring block, or so on.

As still another example, prediction based on local illumination compensation may be selectively performed on the basis of a combination of the above-described embodiments.

The prediction/reconstruction method based on local illumination compensation may be performed on the basis of the prediction block of the luma block. When the luma block is partitioned into subblocks for prediction, each subblock is processed on the basis of local illumination compensation. Herein, information related to local illumination compensation may be signaled on a per-subblock basis or may be signaled on the basis of the block before being partitioned into subblocks.

For example, in the case of prediction/reconstruction based on local illumination compensation on a per-subblock basis, at least one piece of information among whether local illumination compensation is applied, the application method, the range of the reference region determined to calculate a local illumination compensation parameter, the number and the positions of the samples used to calculate the local illumination compensation parameter within the reference region, and a method of calculating the local illumination compensation parameter may be determined adaptively on a per-subblock basis.

The information on whether application takes place on a per-subblock basis and/or the information adaptively determined on a per-subblock basis may be signaled from the encoder to the decoder. Alternatively, the information may be a value pre-established in the encoder/decoder. Alternatively, the information may be determined by the decoder using predetermined information. For example, the information may be adaptively determined by information on the size of the current decoding block or decoding subblock, the coordinates of the decoding block or subblock, the size of the MV, the size of the difference MV, the index of the reference picture, the inter prediction mode, MV accuracy (or resolution), or the like. Alternatively, the information may be selectively determined on the basis of a combination of the above-described embodiments.

The subblocks may share/reuse the local illumination compensation parameter depending on a predetermined condition.

For example, multiple subblocks may share one local illumination compensation parameter.

As another example, the current subblock may reuse all or a part of the local illumination compensation parameters of the previous subblock. Herein, the position of the previous subblock may be a fixed position pre-established in the encoder/decoder. For example, the previous subblock may be a subblock positioned at least one among the left and the top of the current block. Alternatively, the previous subblock may be a subblock decoded immediately before the current block. Alternatively, the position or the index of the previous subblock may be signaled.

In the meantime, information indicating whether sharing/reuse takes place, the range/size of the subblock performing sharing/reuse, and information on the position/direction/index, or the like of the previous subblock subjected to reuse may be signaled from the encoder to the decoder, or may be derived by the decoder. Herein, although the range of sharing/reuse is described on a per-block basis, without limited thereto, the same is applied to a unit, such as a CTU, a CTU row, a brick, a tile, a slice, a picture, or the like in the same/similar manner.

The above-described embodiment related to prediction/reconstruction of the luma block based on local illumination compensation may be applied in prediction/reconstruction of the chroma block in the same/similar manner. Further, when the luma block is predicted/reconstructed on the basis of local illumination compensation, application to the chroma block takes place depending on that. Herein, the index and the flag indicating whether local illumination compensation is applied may be omitted. Further, the embodiment related to prediction/reconstruction of the chroma block may be applied independently regardless of whether application to the luma block takes place. Herein, information on whether local illumination compensation of the chroma block is applied may be signaled through an index or a flag.

Figure 12:
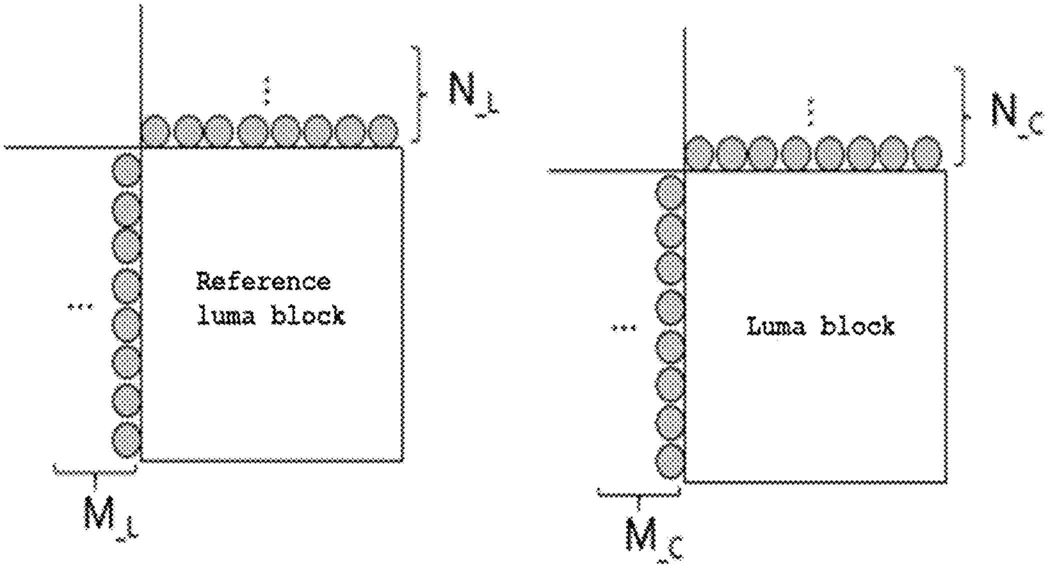
FIGS. 12 and 13 are diagrams illustrating a reference region used in local illumination compensation according to an embodiment of the present invention.
Figure 13:
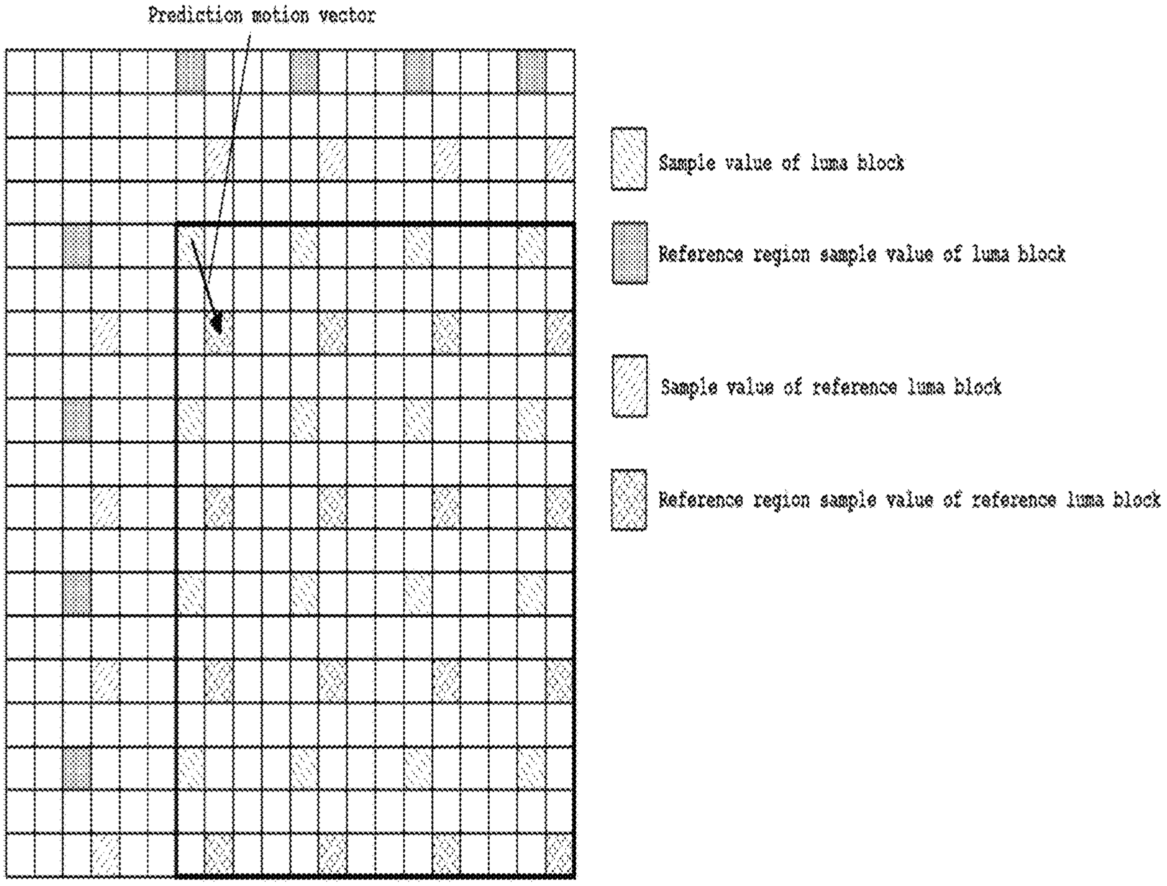

FIGS. 12 and 13 are diagrams illustrating a reference region used in local illumination compensation according to an embodiment of the present invention.

The reference region is a region adjacent to the surround of the luma block and/or reference luma block, and may refer to a region pre-reconstructed before the luma block and/or reference luma block according to a predetermined decoding order.

For example, referring to FIG. 12, the reference region may refer to a region adjacent to the left or the top of the luma block and/or reference luma block.

As another example, referring to FIG. 13, the reference region may refer to an interpolated region corresponding to the position of the motion vector of the luma block in a pre-reconstructed region of the reference luma block.

The position of the motion vector may refer to resolution or accuracy of the motion vector. For example, the motion vector may have resolution, such as ½, ¼, ⅛, 1/16, 1/32, or the like.

The sample of the reference region of the reference luma block may be obtained by performing a predetermined interpolation process in the reference region of the reference luma block.

For example, the sample of the reference region of the reference luma block may be determined to be a value of the interpolation position that is the same as that of the motion vector of the luma block by applying the same interpolation filter as the reference luma block.

As another example, the sample of the reference region of the reference luma block may be determined to be a value of the interpolation position that is similar to that of the motion vector of the luma block by applying an interpolation filter to the reference region of the reference luma block.

As still another example, the sample of the reference region of the reference luma block may be determined to be a value of the interpolation position that is similar to that of the motion vector of the luma block by applying, to the reference region of the reference luma block, an interpolation filter, such as a low pass filter, a high pass filter, a band pass filter, a deblocking filter, an ALF, or the like.

As still another example, the sample of the reference region of the reference luma block may be selectively processed on the basis of a combination of the above-described embodiments.

As still another example, although not shown in FIGS. 12 to 13, the region adjacent to the top left of the luma block/reference luma block, the pre-reconstructed region adjacent to the right, the bottom, or the bottom right according to the decoding order, and the interpolation region according thereto may be used as the reference regions.

The reference region may be determined on the basis of at least one among the encoding information of the reference luma block and/or the encoding information of the neighboring region.

Herein, the determination may be performed using at least one among the position (including the position of the integer sample and the position of the interpolation sample), the number, the size (width/height), the shape, the length of the reference region, and priority with the candidate reference region.

The candidate reference region may refer to one or more candidate regions available as the reference regions. Herein, the reference region may refer to a region as which one among the candidate reference regions is determined.

The neighboring region may refer to a block reconstructed before the reference luma block according to the decoding order. For example, the neighboring region may be a block adjacent to at least one among the left, right, top, bottom, and corners of the reference luma block.

The reference region may be determined according to a predetermined condition.

For example, the reference region may be derived on the basis of the encoding information of the luma block/reference luma block and the encoding information of the neighboring block. For example, when the luma block is encoded in the merge/skip mode or the AMVP mode, the entire or partial region of the neighboring block is determined as the reference region and the reference region of the reference luma block is determined using a relationship in encoding information between the reference luma block and the neighboring reference region.

As another example, when the size of the luma block is equal to or smaller than a threshold value, left and top reference regions are used as the reference regions. Otherwise, any one of left and top reference regions may be used.

As still another example, when the luma block is in a non-square shape of N×M (N<M), the left reference region is used. The size, length, and width of the reference region may be determined depending on the size of the block, but this does not mean that the reference region is limited to the size of the current decoding block. That is, when the current block decoded through local illumination compensation is in an N×M size, the reference region corresponding to M is equal to or larger than M and the reference region corresponding to N is equal to or larger than N.

As still another example, the reference region may consist of only pixels having the coordinates that are the same as at least one among the x-coordinate and the y-coordinate of the current decoding block.

As still another example, the top reference region of the current decoding block may have the length shorter than the width of the current decoding block. Alternatively, the left reference region of the current decoding block may have the length shorter than the height of the current decoding block. To this end, the neighboring region of the current decoding block may be involved in a predetermined down sampling process. Alternatively, the reference region may be defined to be a region excluding k pixels (or pixel lines) from the neighboring region. Here, k may be an integer equal to or larger than 1 and smaller than the width and/or height of the current decoding block.

Information on the reference region may be determined according to a predetermined method.

For example, the information on the reference region may be signaled from the encoder to the decoder. The decoder may determine the reference region on the basis of the signaled information. For example, the information on the reference region is information specifying the reference region, which may include at least one piece of information among the position, the number, the size (width/height), the shape, the length of the reference region, and priority with the candidate reference region. The information may be signaled in at least one among a video sequence, a picture, a predetermined piece region (for example, a slice, a tile, a block group, a block, a subblock, a CTU row, or the like).

As another example, the information on the reference region may be determined by the decoder in the decoding process. For example, the encoder may determine the reference region (for example, the top reference region or the left reference region) through the relationship in encoding information between the reference luma block and the reference candidate region, may determine, on the basis of the determination, the reference region of the luma block to be the same as the determined reference region, and may determine an illumination compensation parameter. By using the same determination method as in the encoder, the decoder may determine the reference region of the reference block through the relationship between the reference luma block and the reference candidate region, and may determine, on the basis of the determination, the reference region of the luma block to be the same as the determined region.

Herein, including the difference in a pixel value of a decoded luma sample, a variation, connectivity (or continuity), or the like, the relationship in encoding information may be specified considering a value, such as the prediction mode of the sample, the direction/angle of intra prediction, whether the intra prediction mode is non-angular, the value of the motion vector of inter prediction, the direction of the merge/skip mode, the position of the luma block, or the like. Herein, the position of the luma block may include information about whether it is in contact with the boundary of a predetermined piece region. The piece region may refer to a slice, a tile, a sub-tile (brick), a CTU row, a block group, a subblock, or the like. That is, the reference region for calculating the local illumination compensation parameter of the currently decoded luma and/or chroma component may be adaptively determined considering the relationship in encoding information by connectivity rather than the coordinate surround of the currently decoded block. For example, when the current block is a block predicted in the merge mode, the local illumination compensation parameter is calculated using the merge block and the reference region of the merge block according to the merged direction of the current block. Further, on the basis of the relationship between the merge block and the reference region of the merge block, the local illumination compensation parameter of the current block may be determined in the same manner.

The local illumination compensation parameter may be adaptively calculated depending on the reference region. Alternatively, a step of calculating the local illumination compensation parameter may be omitted, and on the basis of the local illumination compensation parameter previously calculated considering the encoding relationship, the local illumination compensation parameter of the current block may be determined. The encoding relationship may be limited to the inside of the same frame, the same tile, the same slice, or the like, considering the definition of dependency between block sets defined in the higher level.

As described above, the reference region may be adaptively determined. In the meantime, there may be a case where the reference region is unavailable. Herein, the unavailable case may refer to cases where the determined reference region is un-decoded, where the determined reference region is positioned outside the picture, or so on. The un-decoded case may refer to a case where the determined reference region belongs to the same parallel processing region as the luma block/reference luma block or where the determined reference region is decoded after the luma block/reference luma block according to the decoding order.

In the case where the determined reference region is unavailable, the reference region is limited not to be used in prediction based on local illumination compensation. To this end, flag information on whether the reference region is used may be used. Alternatively, the unavailable reference region may be replaced by an available reference region. The available reference region may be a region adjacent to the unavailable reference region in a particular direction. The particular direction may be any one of the left, right, top, bottom, and diagonal. The particular direction may be pre-established in the encoder/decoder, or may be determined variably considering the position of the unavailable reference region.

The number of sample lines belonging to the reference region may be one, two, or more. As shown in the example in FIG. 12, the top reference region of the reference luma block may include N_L horizontal lines, and the left reference region may include M_L vertical lines. The top reference region of the luma block may include N_C horizontal lines, and the left reference region may include M_C vertical lines. Herein, the numbers (N_L and N_C) of the sample lines in the reference region may be the same as the numbers (M_L and M_C) of the sample lines in the left reference region, respectively. Alternatively, the numbers (N_L and N_C) of the sample lines in the top reference region may be larger or smaller than the numbers (M_L and M_C) of the sample lines in the left reference region, respectively.

The values of N_L, M_L, N_C, and M_C may be integers equal to or larger than 0. The values of the N_L, M_L, N_C, and M_C may be set to values pre-established in the encoder/decoder, or may be variably determined on the basis of the above-described encoding information. Alternatively, information on the number of the sample lines may be encoded by the encoder for signaling, and the decoder may determine the values of N_L, M_L, N_C, and M_C on the basis of the signaled information.

As described above, the reference region may include multiple sample lines. Herein, in the example shown in FIG. 11, some samples may belong to the same sample line among the multiple sample lines. Alternatively, at least one of some samples and another sample may belong to different sample lines.

In the meantime, the shape of the block shown in FIG. 12 and/or FIG. 13 is in a square shape of N×N, but this does not limit the size or shape of the block, and various sizes/shapes are possible by the above-described partitioning types.

The above-described embodiment related to determination of the reference region of the luma block on the basis of local illumination compensation may be applied to determination of the reference region of the chroma block in the same/similar manner. Further, the determination of the reference region of the chroma block may or may not be dependent on the method of determining the reference region of the luma block. In the case of the dependent determination, signaling related to the method of determining the reference region of the chroma block may not be included on the basis of the method of determining the luma block. In the case of the independent determination, information required for the method of determining the reference region of the chroma block may be signaled.

In order to perform illumination compensation of the current block, a linear model related to illumination compensation may be determined. When the current block uses bi-directional prediction, the linear model for the current block is defined as in the example in Equation 1 on the basis of a prediction value of each direction.

$$pred'_{(i,j)} = ((\alpha_0 \cdot pred_0(i, j) + \beta_0) + (\alpha_1 \cdot pred_1(i, j) + \beta_1)) \gg 1 \quad \text{[Equation 1]}$$

In Equation 1, pred'(i,j) may denote the prediction value of the current block on which illumination compensation is performed.

Alternatively, as shown in the example in Equation 2, the linear model for the current block may be defined.

$$pred'_{(i,j)} = \alpha \cdot (pred_0(i, j) + pred_1(i, j)) \gg 1) + \beta \quad \text{[Equation 2]}$$

A linear model parameter may be stored according to a predetermined method.

For example, before decoding on a per-block basis is completed, the reconstructed sample and the prediction signal may be used to calculate the linear model, and then the linear model parameter may be stored. Then, this may be referenced for illumination compensation in a block to be decoded later.

As another example, the linear model parameters may be stored on a per-N×M basis, and the stored linear model parameter may be used for illumination compensation of a block which is performed afterwards.

Figure 14:
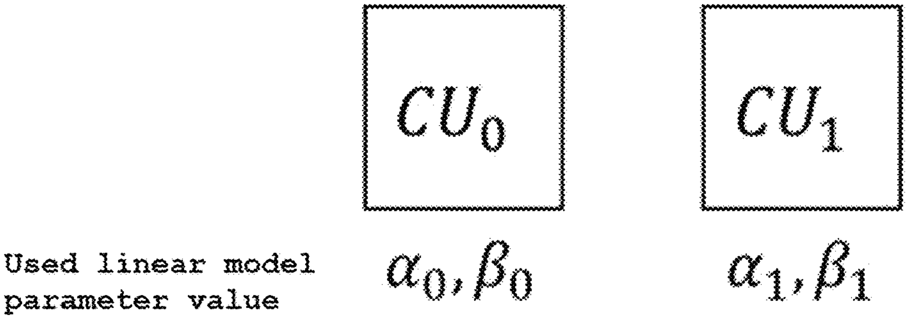
FIG. 14 is a diagram illustrating a process of storing a linear model parameter according to an embodiment of the present invention.

As still another example, the linear model parameter may be stored as a difference value. Referring to FIG. 14, by using the linear model parameter stored before the current block, the difference value with the linear model parameter of the current block may be stored.

Among the multiple linear model parameters stored in the neighboring block of the current block, one linear model parameter selected according to a predetermined condition may be used to perform illumination compensation of the current block.

Examples of the predetermined condition may include conditions, such as the size of the current CU, the prediction mode, whether merging is used, motion information, or the like. In the meantime, information for indicating whether the illumination compensation method is used may be encoded/decoded.

The linear model may be determined using a reconstructed sample and a prediction sample for samples at a predetermined position of the current block.

Figure 15:
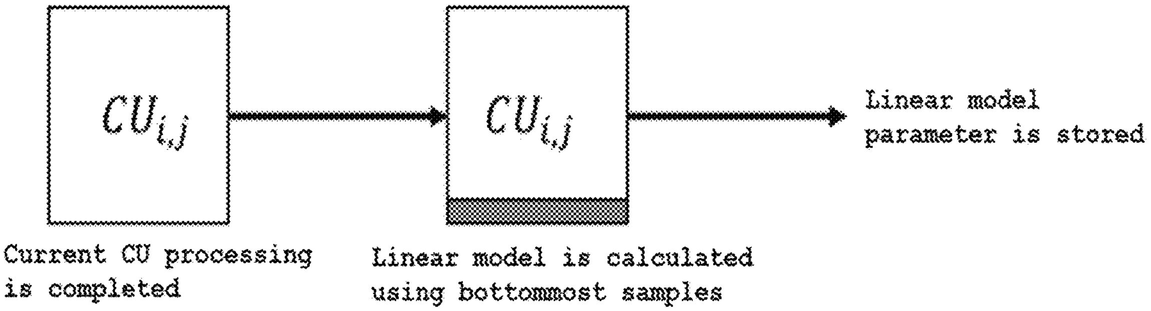
FIGS. 15 and 16 are diagrams illustrating determination of a linear model by using the bottommost sample and a process of illumination compensation according to an embodiment of the present invention.
Figure 16:
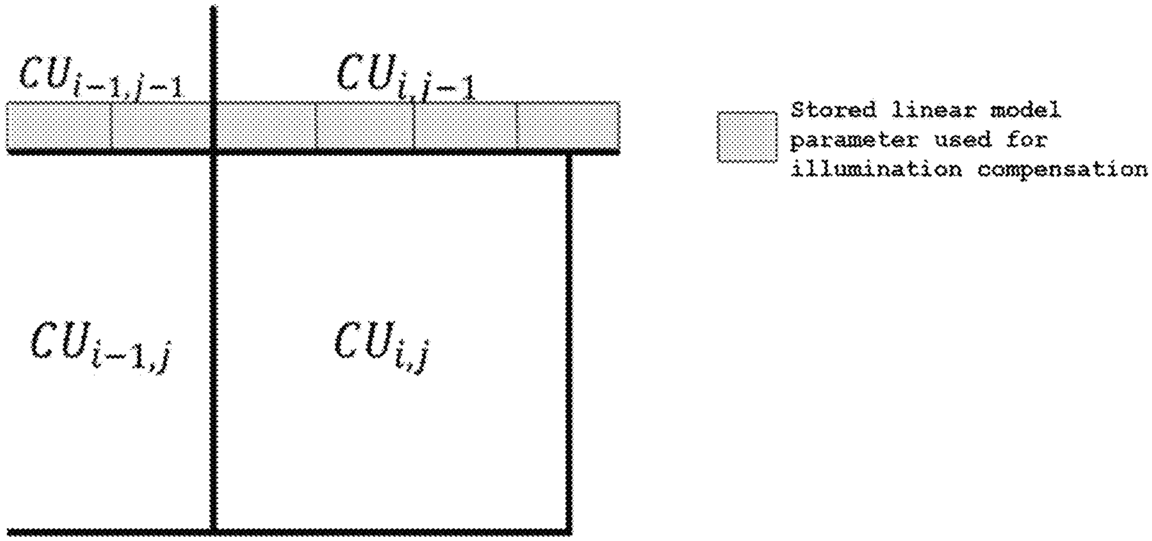

FIGS. 15 and 16 are diagrams illustrating determination of a linear model by using the bottommost sample and a process of illumination compensation according to an embodiment of the present invention. A scale parameter and an offset parameter for the calculated linear model may be stored on a per-N×M basis. When illumination compensation is performed on a block to be decoded later, one among the already stored linear model parameters in the top blocks of the corresponding block may be selected as shown in the example in FIG. 16. However, without limited thereto, parameters stored in left, bottom left, top left, and top right blocks of the corresponding block may be used.

The linear model may be determined using an offset parameter without using a scale parameter. For example, the offset parameter may be calculated using the difference sample of the reference block.

Figure 17:
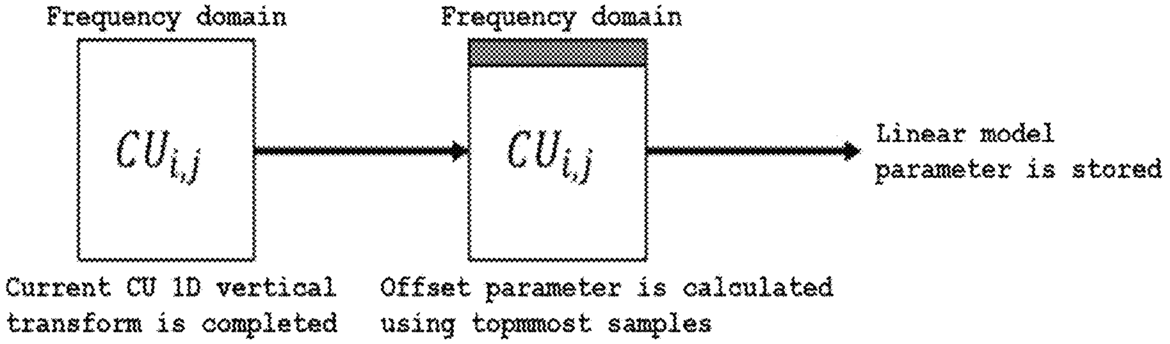
FIG. 17 is a diagram illustrating a process of determining a linear model by using the topmost sample in a frequency domain according to an embodiment of the present invention.

FIG. 17 is a diagram illustrating a process of determining a linear model by using the topmost sample in a frequency domain according to an embodiment of the present invention.

When 1D vertical transform is performed during inverse transform of the current block, the values of the topmost samples resulting from operation refer to averages (DC) of respective rows for the corresponding block. Therefore, as shown in the example in FIG. 17, in the middle of inverse transform operation, the average of the difference samples of the corresponding block may be calculated as the offset parameter for storage. When illumination compensation is performed on the current block, a value obtained by adding the offset parameter (namely, the average value of the difference samples stored during inverse transform of the reference block) used in the current block and the average value of the difference samples of the current block is stored as the offset parameter to be used for illumination compensation afterwards.

When the linear or non-linear model parameter for illumination compensation used by the encoder is transmitted to the decoder, an available candidate of the corresponding model and index information are transmitted to the decoder. Alternatively, considering conditions, such as the prediction mode of the neighboring block, the size of the current block, the sizes of the scale parameter and the offset parameter, the reference picture number, or the like, the encoder/decoder may select one of the linear model parameters in the same manner. The decoder may the received information on the candidate of the linear or non-linear model and the related index to perform compensation for the decoded luma component, and may store the same for reference. Further, the linear or non-linear model parameter and the related index received from the encoder may be stored to be used later as a parameter for the luma or chroma component.

The linear model may be obtained by calculating linearity between the luma component and the luma component or calculating linearity between the chroma component and the chroma component. Therefore, for illumination compensation, a total of three linear models may be calculated for storage according to Y, Cb, and Cr, respectively. Herein, the linear model parameter for illumination compensation of the luma component may be modified into a linear model parameter to be used for illumination compensation of the chroma component. That is, scale compensation on the residual signal of the chroma component may be performed using the scale parameter, which is illumination compensation information for the linear model received from the encoder, and/or the related index, and reconstruction of the chroma component may be performed using the result of the compensation.

With respect to linear model parameters $\alpha$ and/or $\beta$ calculated for illumination compensation of the luma component, a linear model between the luma component and the predictor of the chroma component may be obtained, and the obtained linear model parameter to obtain a linear model parameter for illumination compensation of the chroma component.

The linear model parameter may be stored for management. The linear model parameter that may be calculated after decoding of the CU is completed or during inverse transform of the CU may be managed using FIFO. In FIFO, N linear model parameters may be stored, and each linear model parameter may be a linear model parameter candidate that may be used for illumination compensation.

Figure 18:
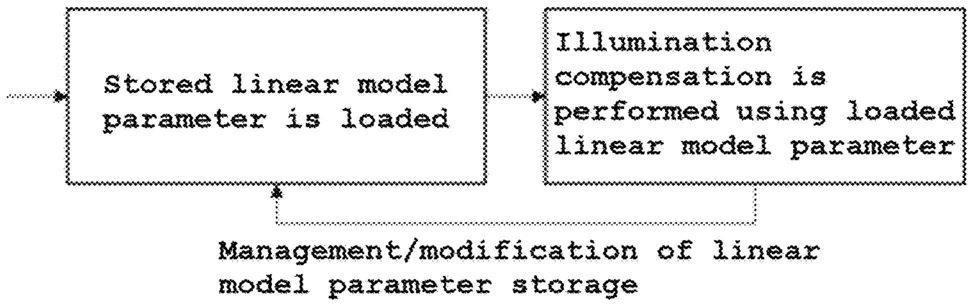
FIG. 18 is a diagram illustrating a decoding process for performing illumination compensation according to an embodiment of the present invention.

FIG. 18 is a diagram illustrating a decoding process for performing illumination compensation according to an embodiment of the present invention.

FIG. 18 may be an example of a decoding process for a history based illumination compensation method. Referring to FIG. 18, a list of linear model parameters stored for FIFO may be updated (that is, management/modification of a linear model parameter storage) after illumination compensation is performed.

Figure 19:
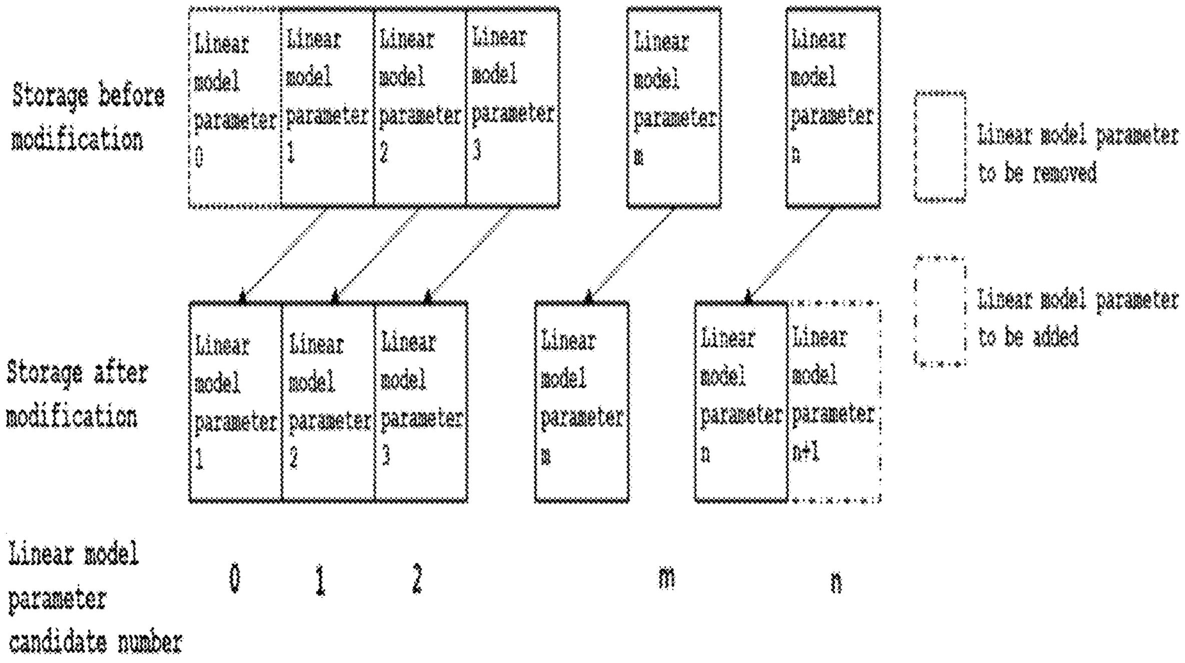
FIG. 19 is a diagram illustrating a process of managing a linear model parameter for performing illumination compensation according to an embodiment of the present invention.

FIG. 19 is a diagram illustrating a process of managing a linear model parameter for performing illumination compensation according to an embodiment of the present invention.

FIG. 19 may be an example of a process of managing a linear model parameter for a history based illumination compensation method. Referring to FIG. 19, when there are multiple available linear model parameters, the linear model parameters having the same value are removed according to a predetermined condition, and among the remaining candidates, a parameter is removed considering a reference picture index. Afterwards, among the remaining candidates, the leftmost parameter of the parameters stored in the CU closest from the current CU is assigned high priority for use.

When performing illumination compensation, the used linear model parameter is stored in a memory for the linear model parameters. The memory space for the linear model parameter may be managed in the form of FIFO. When there is no more space to store in the storage for FIFO, referring to FIG. 19, the previously stored parameter is removed and update takes place with a linear model parameter calculated for current illumination compensation for storage. Alternatively, when the linear model parameter has the same value as the linear model parameter stored for FIFO, the linear model parameter is not stored. In the meantime, the linear model parameter may be initialized by a predetermined unit. Herein, the predetermined unit may refer to a picture group, a picture, a slice, a tile, or the like. In this case, the pre-stored parameter may be eliminated, and an initial value pre-established in the decoder may be set as the parameter.

Figure 20:
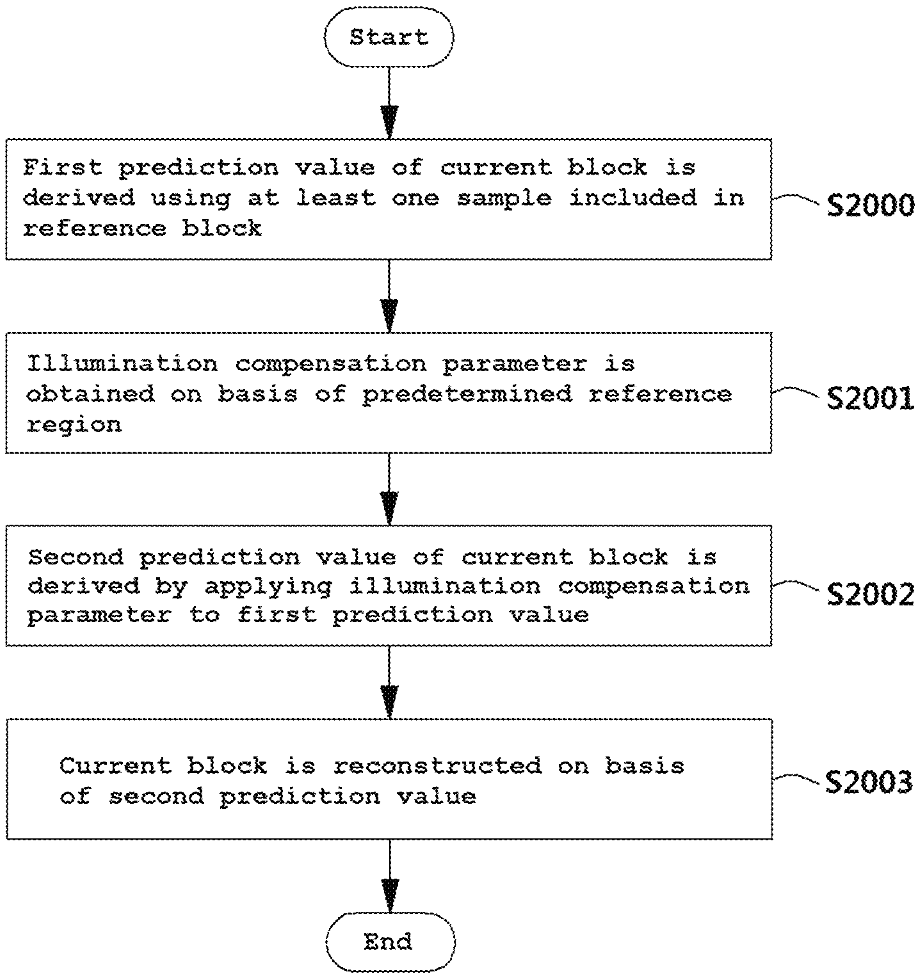
FIG. 20 is a flowchart illustrating an image decoding method according to an embodiment of the present invention.

FIG. 20 is a flowchart illustrating an image decoding method according to an embodiment of the present invention.

At step S2000, a first prediction value of the current block may be derived using at least one sample included in the reference block.

In the meantime, the first prediction value may be one among a value of a reference sample included in the reference block corresponding to a position of at least one sample included in the current block and a value obtained by performing predetermined filtering on the reference sample.

In the meantime, the filtering may be performed on the basis of a predetermined mapping table.

In the meantime, information on the mapping table may be signaled in an adaptation parameter set.

In the meantime, the predetermined mapping table may include a first mapping table. The first mapping table may be derived on the basis of information on the mapping table, and a second mapping table corresponding to the first mapping table may be derived using the first mapping table.

In the meantime, when the current block is in the intra prediction mode, the filtering is performed using the first mapping table. When the current block is in the inter prediction mode, the filtering is performed using the first mapping table and the second mapping table.

At step S2001, the illumination compensation parameter may be obtained on the basis of a predetermined reference region.

In the meantime, the illumination compensation parameter may be obtained on the basis of a linear relationship between the reference region and the current block.

In the meantime, the illumination compensation parameter may include at least one among a weighting factor, an offset, and a filter coefficient.

At step S2002, a second prediction value of the current block may be derived by applying the illumination compensation parameter to the first prediction value.

In the meantime, the second prediction value may be obtained by applying at least one among the weighting factor and the offset to the first prediction value.

At step S2003, the current block may be reconstructed on the basis of the second prediction value. In the meantime, when the current block is the luma block, a residual block for the chroma block corresponding to the luma block may be obtained on the basis of the illumination compensation parameter for the luma block.

Figure 21:
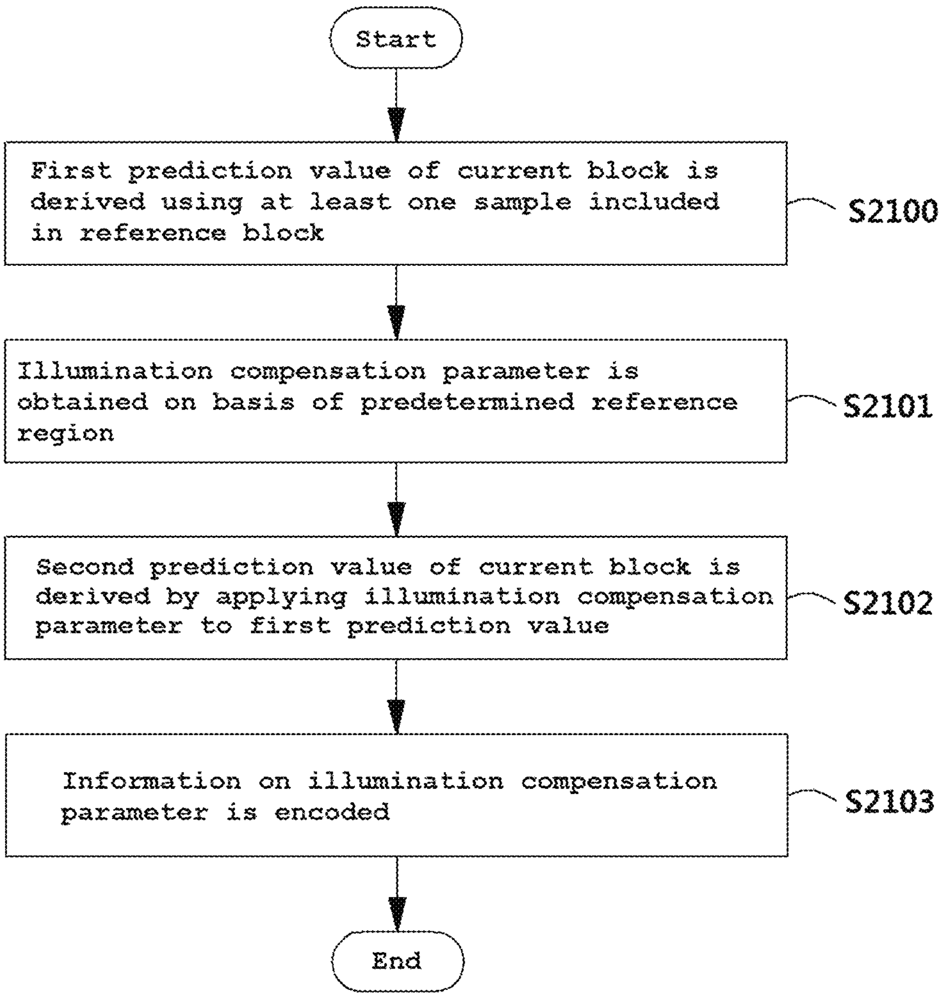
FIG. 21 is a flowchart illustrating an image encoding method according to an embodiment of the present invention.

FIG. 21 is a flowchart illustrating an image encoding method according to an embodiment of the present invention.

At step S2100, the first prediction value of the current block may be derived using at least one sample included in the reference block.

In the meantime, the first prediction value may be one among a value of a reference sample included in the reference block corresponding to a position of at least one sample included in the current block and a value obtained by performing predetermined filtering on the reference sample.

In the meantime, the filtering may be performed on the basis of a predetermined mapping table.

In the meantime, information on the mapping table may be signaled in an adaptation parameter set.

In the meantime, the predetermined mapping table may include a first mapping table. The first mapping table may be derived on the basis of information on the mapping table, and a second mapping table corresponding to the first mapping table may be derived using the first mapping table.

In the meantime, when the current block is in the intra prediction mode, the filtering is performed using the first mapping table. When the current block is in the inter prediction mode, the filtering is performed using the first mapping table and the second mapping table.

At step S2101, the illumination compensation parameter may be obtained on the basis of a predetermined reference region.

In the meantime, the illumination compensation parameter may be obtained on the basis of a linear relationship between the reference region and the current block.

In the meantime, the illumination compensation parameter may include at least one among a weighting factor, an offset, and a filter coefficient.

At step S2102, the second prediction value of the current block may be derived by applying the illumination compensation parameter to the first prediction value.

In the meantime, the second prediction value may be obtained by applying at least one among the weighting factor and the offset to the first prediction value.

At step S2103, information on the illumination compensation parameter may be encoded.

According to the present invention, it is possible to provide a computer-readable non-transitory recording medium storing image data that is received and decoded by an image decoding apparatus to be used for reconstructing an image, wherein the image data includes information on an illumination compensation parameter, the information on the illumination compensation parameter is used to obtain an illumination compensation parameter for a current block on the basis of a predetermined reference region, a first prediction value of the current block is derived using at least one sample included in a reference block, a second prediction value of the current block is derived by applying the illumination compensation parameter to the first prediction value, and the current block is reconstructed on the basis of the second prediction value.

According to the present invention, it is possible to provide a method and an apparatus for encoding/decoding an image on the basis of local illumination compensation.

Also, according to the present invention, it is possible to provide a method and an apparatus for encoding/decoding an image on the basis of local illumination compensation through derivation of a relationship between samples.

Also, according to the present invention, it is possible to provide a method and an apparatus for enhancing image encoding/decoding efficiency by more adaptively obtaining an illumination compensation coefficient.

Also, according to the present invention, it is possible to provide image encoding/decoding method and apparatus that enhance video encoding/decoding efficiency through derivation of a relationship between samples for local illumination compensation.

Also, according to the present invention, it is possible to provide a method and an apparatus that enhance prediction efficiency and enable effective video encoding/decoding by obtaining a local illumination compensation parameter with use of selective samples.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes;

optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A method of decoding a video, the method comprising:

determining an intra-prediction mode of a current chroma block;

in response to the intra-prediction mode representing intra-prediction between color components, deriving linear model parameters of the current chroma block;

obtaining a prediction block of the current chroma block based on the linear model parameters and a reconstructed luma block corresponding to the current chroma block; and reconstructing the current chroma block based on the prediction block of the current chroma block, wherein the linear model parameters are derived based on a luma template region adjacent to the reconstructed luma block and a chroma template region adjacent to the current chroma block, wherein down-sampled luma samples are obtained by applying down-sampling filter to the luma template region, wherein the linear model parameters are derived based on a maximum luma reference value, a minimum luma reference value, a maximum chroma reference value and a minimum chroma reference value, wherein the maximum luma reference value is obtained by using a maximum down-sampled luma sample in the luma template region, and the maximum chroma reference value is obtained by using a first chroma sample that has a position corresponding to the maximum down-sampled luma sample, and wherein the minimum luma reference value is obtained by using a minimum down-sampled luma sample in the luma template region, and the minimum chroma reference value is obtained by using a second chroma sample that has a position corresponding to the minimum down-sampled luma sample.

2. The method of claim 1, wherein in response to the current chroma block having a size different from the reconstructed luma block, a prediction sample in the current chroma block is obtained from a down-sampled reconstructed sample in the reconstructed luma block.

3. The method of claim 1, wherein the intra-prediction between color components is defined as one of intra-prediction modes.

4. The method of claim 1, wherein whether the intra prediction mode indicates the intra-prediction between color components or not is determined based on information explicitly signaled via a bitstream.

5. A method of encoding a video, the method comprising:

determining an intra-prediction mode of a current chroma block;

in response to the intra-prediction mode representing intra-prediction between color components, deriving linear model parameters of the current chroma block;

obtaining a prediction block of the current chroma block based on the linear model parameters and a reconstructed luma block corresponding to the current chroma block; and obtaining a residual block of the current chroma block based on the prediction block, wherein the linear model parameters are derived based on a luma template region adjacent to the reconstructed luma block and a chroma template region adjacent to the current chroma block, wherein down-sampled luma samples are obtained by applying down-sampling filter to the luma template region, wherein the linear model parameters are derived based on a maximum luma reference value, a minimum luma reference value, a maximum chroma reference value and a minimum chroma reference value, wherein the maximum luma reference value is obtained by using a maximum down-sampled luma sample in the luma template region, and the maximum chroma reference value is obtained by using a first chroma sample that has a position corresponding to the maximum down-sampled luma sample, and wherein the minimum luma reference value is obtained by using a minimum down-sampled luma sample in the luma template region, and the minimum chroma reference value is obtained by using a second chroma sample that has a position corresponding to the minimum down-sampled luma sample.

6. A non-transitory computer readable recording medium storing a bitstream which being generated by a method of encoding a video, wherein the method comprises:

determining an intra-prediction mode of a current chroma block;

in response to the intra-prediction mode representing intra-prediction between color components, deriving linear model parameters of the current chroma block;

obtaining a prediction block of the current chroma block based on the linear model parameters and a reconstructed luma block corresponding to the current chroma block; and obtaining a residual block of the current chroma block based on the prediction block, wherein the linear model parameters are derived based on a luma template region adjacent to the reconstructed luma block and a chroma template region adjacent to the current chroma block, wherein down-sampled luma samples are obtained by applying down-sampling filter to the luma template region, wherein the linear model parameters are derived based on a maximum luma reference value, a minimum luma reference value, a maximum chroma reference value and a minimum chroma reference value, wherein the maximum luma reference value is obtained by using a maximum down-sampled luma sample in the luma template region, and the maximum chroma reference value is obtained by using a first chroma sample that has a position corresponding to the maximum down-sampled luma sample, and wherein the minimum luma reference value is obtained by using a minimum down-sampled luma sample in the luma template region, and the minimum chroma reference value is obtained by using a second chroma sample that has a position corresponding to the minimum down-sampled luma sample.

* * * * *